United States Patent
Kişnişci et al.

(10) Patent No.: US 9,633,222 B2
(45) Date of Patent: Apr. 25, 2017

(54) SOCIAL NETWORK PUBLICATION SYSTEM

(71) Applicant: Bilişlik Bilişim Çözümleri A.Ş., Beyoğlu İstanbul (TR)

(72) Inventors: Nuh Naci Kişnişci, İstanbul (TR); Ali Pekşen, İstanbul (TR)

(73) Assignee: BILISLIK BILISIM COZUMLERI A.S., Beyoglu, Istanbul (TR)

(*) Notice: Subject to any disclaimer, the term of this patent is extended or adjusted under 35 U.S.C. 154(b) by 0 days.

(21) Appl. No.: 14/557,642

(22) Filed: Dec. 2, 2014

(65) Prior Publication Data
US 2016/0154974 A1 Jun. 2, 2016

(51) Int. Cl.
*G06F 21/62* (2013.01)
*G06F 17/30* (2006.01)
(Continued)

(52) U.S. Cl.
CPC ........ *G06F 21/6245* (2013.01); *G06F 3/0482* (2013.01); *G06F 3/04842* (2013.01);
(Continued)

(58) Field of Classification Search
CPC ............... G06F 21/6245; G06F 3/0482; G06F 3/04842; G06F 17/30528; G06F 17/30867; H04L 63/102; H04L 65/403; G06Q 50/01
See application file for complete search history.

(56) References Cited

U.S. PATENT DOCUMENTS 7,269,590 B2 9/2007 Hull et al.
7,756,926 B2 7/2010 Tseng et al.
(Continued)

FOREIGN PATENT DOCUMENTS

WO 2012/131429 10/2012

OTHER PUBLICATIONS https://www.smugmug.com/ 2005.*
(Continued)

*Primary Examiner* — Kristy A Haupt
(74) *Attorney, Agent, or Firm* — Notaro, Michalos & Zaccaria P.C.

(57) ABSTRACT

A method and system providing a Social Network Publication System (SNPS). Users create publications using cards. Catalog cards hold other cards and are used to build multi-layer publications. Function cards hold substantive content and interactive modules. Users customize permissions for their cards to control how their publications are interacted with and shared by other users. Users can search publications using filters. The streamlined editing system is based on nested cards. Users can become followers and watchers of other user and publications.

19 Claims, 32 Drawing Sheets

(51) Int. Cl.
  *H04L 29/06* (2006.01)
  *G06F 3/0482* (2013.01)
  *G06F 3/0484* (2013.01)
  *G06Q 50/00* (2012.01)

(52) U.S. Cl.
  CPC .. *G06F 17/30528* (2013.01); *G06F 17/30867* (2013.01); *G06Q 50/01* (2013.01); *H04L 63/102* (2013.01); *H04L 65/403* (2013.01)

(56) References Cited

U.S. PATENT DOCUMENTS

| | | |
|---|---|---|
| 7,827,265 B2 | 11/2010 | Cheever et al. |
| 8,694,439 B2 | 4/2014 | Shafique |
| 8,775,328 B1 | 7/2014 | Abhyanker |
| 2011/0185020 A1 | 7/2011 | Ramamurthy et al. |
| 2012/0084362 A1 | 4/2012 | McBrearty |
| 2014/0025733 A1 | 1/2014 | Khan et al. |

OTHER PUBLICATIONS

International Preliminary Report on Patentability for PCT/TR2015/000348 Filed on Nov. 23, 2015.
Written Opinion for PCT/TR2015/000348, Jan. 2015.

\* cited by examiner

Function Menu for Owner

C Card Menu
F Function Menu

Function Menu, Selected "Comment" for Owner

C Card Menu
F Function Menu

Function Card, Settings for Owner

C Card Menu
S Settings

FIG. 26

SOCIAL NETWORK PUBLICATION SYSTEM

BACKGROUND

The present invention relates generally to the field of electronic media, and in particular to a Social Network Publication System (SNPS) that can be provided on a network for users to access, interact with, and publish content.

The SNPS can be used with, but is different and separate from, internet and social media platforms such as Facebook® and LinkedIn®, and can also be used on its own. The SNPS is an improvement on prior art digital publication systems and internet page editing platforms.

SUMMARY OF THE INVENTION

It is an object of the present invention to provide an improved system for individuals to custom assemble multi-tiered publications, including digital publications. It is a further object to provide greater control over user generated content than is currently available.

The invention allows users to create publications including but not limited to books, magazines, periodicals, bulletins, encyclopedias. The process starts by creating a "card", which is the main element in the invention. The initial blank "card" is converted to a "catalogue" card that contains other "cards" or to a "function" card that displays content, invites viewer interaction, or performs other functions. The same card can be published and republished in different presentation contexts, and with different interaction rules and varying levels of third party accessibility.

The SNPS system can be run as an internet website, but can also be hosted at a local hub, or, at least for card editing, on a user electronic device, or on any other electronic device. The invention includes both methods of providing SNPS systems, and computers and networks implementing an SNPS.

The invention can be used with various hardware, internet, and network elements, including those used with known internet, media, and social networking services such as described in U.S. Pat. No. 7,269,590 (Yahoo®), U.S. Pat. No. 7,827,265 (Facebook®), U.S. Pat. Nos. 8,694,439, 7,756,926, and 8,775,328, which are incorporated as background.

One aspect of the invention is a method of providing a Social Network Publication System (SNPS) including providing at least one computer system having non-transitory SNPS instructions stored thereon, and executing the SNPS instructions. Typically the computer system comprises at least one server, and is in communication with a plurality of electronic user devices through a communication network. User devices present a graphical interface which allow users to interact with the SNPS.

The SNPS allows a first user using a user device to establish a user account in the SNPS. The first user can be any user. The first user creates cards, which are typically blank cards when they are first created. Blank cards are not yet designated as either a function card (holding content and/or interactive elements) or a catalog card (which holds and organizes other cards).

In an example scenario, the first user creates a first card. The first user designates the first card to be a catalog card, where the catalog card is capable of holding one or more other cards. They then create a second card within the first card. In this scenario, the first user designates the second card to be a function card, where the function card is capable of holding media content and interactive modules. The user then adds media content and/or an interactive module to the second card. Typically the user will add more cards, or only a single card may be used. A variety of different content and interaction items can be arranged in pages in a nested hierarchy.

The first user selects permission settings for at least one of cards. Cards may each get their own settings, or there may be blanket settings for a group of card or all cards created by that user. The permission settings can include instructions that one or more other users of the SNPS are or are not allowed to interact with the at least one card, and instructions that one or more other users are or are not allowed to share the at least one card with third parties.

After one or more cards have been created and said permissions set, the first user publishes his or her cards. The cards become available and accessible to one or more other users once they are published. The cards may be available to all SNPS users, or only designated users, depending on the permissions defined for and attributed to the card by the user.

In this simplified scenario, users other than the first user who created and owns the cards are represented by the second user. The SNPS allows a second user using a user device to perform a search within the SNPS using one or more search criteria, the search identifying a set of published cards meeting the search criteria, the set of published cards comprising one or more cards previously published by other users, including the first user. The search may be guided by criteria and filters selected by the second user.

The second user will typically view at least one of the cards identified in the search, such as the first and second cards mentioned above created by the first user. What cards the second user can see, interact with, and share will be determined by the privilege settings put in place by other users, such as our first user.

The SNPS permission settings set by the first user can be used to determine if the second user is allowed to interact with at least one of the cards published by the first user, and offer the second user an option to interact with a card published by the first user only if allowed by the permission settings.

The permission settings set by the first user can also be used to determine if the second user is allowed to share at least one of the cards published by the first user with third parties, offering the second user an option to share a card published by the first user only if allowed by the permission settings.

The first user can add content such as audio content, video content, text, and pictures to function cards, such as the second card. Users can also add an interactive module to the second card, where the interactive module allows other users to post typewritten comments and/or click an icon to express approval or disapproval of content. The first user might turn the second card into a slide card which allows viewers to sequentially view a plurality of content items within the second card by sliding between the items.

In one scenario, the first user selects permission settings for at least one card which prohibit certain other users from sharing that card, the SNPS uses the permission settings set by the first user to determine that a second user is not allowed to share the card, and prevents the second user from sharing the card. This can be accomplished by simply not presenting an option to share the card when the share option might otherwise be available.

In another embodiment, the first user selects permission settings for at least one card having an interactive module which prohibits certain other users from interacting with that card, the SNPS uses the permission settings set by the first user to determine that the second user is not allowed to interact with the card, and prevents the second user from interacting with the card. The first user can also select permission settings for at least one card which prohibits certain other users from viewing that card, so that the SNPS excludes that card from the second user's search results based on the permission settings. Alternatively the card may be in the search results, but partially or fully unavailable for re-use.

The cards may be created within a user profile.

In another example the first user creates a third card within the first card, and designates the third card to be a catalog card which is nested within the first card, and then creates a fourth card within the third card, the fourth card being nested within both the third card and the first card.

After publishing some cards, the first user might withdraw at least one card from publication, so that the withdrawn card is no longer visible to other users.

In a preferred embodiment, when the first user creates the first card it is a blank card. The blank card can include one or more interactive elements which the first user can use to turn the blank card into either a function card or a catalog card. The interactive elements may be clickable icons or buttons, drop down menus, or other interactive screen elements. Typically the elements are graphically presented inside the card, and the first card is represented as a polygon (such as a square or rectangle) on a viewing screen of the user's user device. The shape of the card is selected by the user among the options provided. The interactive elements can be used to turn the blank card into either a function card or a catalog card.

The first card and the second card can be displayed as shapes in a viewing screen of the first user's user device, with the second card represented as a smaller shape which is physically within a larger shape which represents the first card.

In another embodiment the first card and the second card each comprise a plurality of interactive elements for editing each card. The first card has a set of interactive elements which are specific to catalog cards. The second card has a set of interactive elements which are specific to function cards. The sets of interactive cards specific to catalog cards and specific to function cards are different.

The SNPS can use permission settings selected by the first user to determine if the second user is allowed to interact with a card published by the first user which comprises an interactive module, only offering the second user an option to interact with said card based on the permission settings. The second user then has the option of interacting with the card. Similarly, permission settings can be used to determine if the second user is allowed to share the at least one card of the first user, or allowed to perform any other card-related function within the SNPS. The option is only offered to the second other user, or any other user, when allowed by the permissions selected by the first user Shared cards can be shared piecemeal, or as a group in the arrangement selected by the first user. Sharing can include the second user using the at least one card to make their own publication in the SNPS.

In an alternative scenario the first user is a member of a team, the team comprising at least the first user and a third user. The first and third cards might be part of a project belonging to the team. As a member of the team, the third user can then add one or more cards to said project, or otherwise edit the project in the same manner the first user can.

The invention also includes a method of and system for providing a Social Network Publication System (SNPS) comprising some or all of the following steps:

providing at least one computer system having non-transitory SNPS instructions stored thereon, and executing the SNPS instructions;

wherein the computer system comprises at least one server, and is in communication with a plurality of electronic user devices through a communication network;

wherein the user devices present a graphical interface which allow users to interact with the SNPS;

using the SNPS, allowing a first user using a user device to:

create a first card;

designate the first card to be a catalog card, wherein the catalog card is capable of holding one or more other cards;

create a second card within the first card;

optionally adding one or more additional cards;

selecting permission settings for at least one of said cards;

after said cards have been created and said permissions set, publishing the cards, wherein the cards become available to one or more other users once they are published;

using the SNPS, allowing a second user using a user device to view at least one of the cards published by the first user;

the SNPS using permission settings set by the first user to determine interaction options which are available to the second user for said one or more cards being viewed, and offering those interaction options to the second user.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIGS. 25-26 are the top and bottom half of a page from a publication showing a variety of cards;

DESCRIPTION OF THE PREFERRED EMBODIMENTS

Figure 1:
FIG. 1 is an introductory screen.

This invention comprises a Social Network Publication System (SNPS). The SNPS can be provided on a network for users to access, interact with, manipulate, and publish content. The SNPS can also be used to create a personal archive or diary which is not published.

The invention also relates to systems to provide and host social network content comprising one or more database systems, one or more application servers, one or more file servers, and/or one or more storage arrays. This system can be hosted from one or more than one server via an ISP (Internet Service Provider), and in many embodiments will be accessed via internet or other network.

Users can access this system via various devices already known or yet to be invented, such as a personal computer, notebook computer, electronic tablet, smart phone, etc. It may be accessed by using a web browser, an application or program on an electronic device, or other suitable electronic applications.

Each "user" can be an "owner" in some settings (typically working with cards and publications they create), and a "follower" in other contexts (typically when viewing or interacting with cards and publications of others).

A key feature of the invention is the ability to create customized publications including but not limited to books, magazines, periodicals, bulletins, encyclopedias, and the like. The process typically starts with creating a first "card" 20, which is the central element and building block in the invention. A given card 20 can include content and/or functional features, or alternatively can serve a linking or organizing function with regard to other cards. A new card can be converted to a "catalogue" card 22 that contains other cards, including other catalog cards in a hierarchy. A new card can also be a "function" card 21 that contains one or more content elements, such as text, pictures, video, sound recording, etc., and/or contains interactive elements. Each card may have multiple attributes, and can be published and re-published in multiple contexts. Each card may have several functions at the discretion of the user who creates them. Typically catalog cards 22 serve an organizing role, while function cards 21 provide the substance for a publication. Catalog cards 22 and function cards 21 are both subsets or types of cards 20.

The cards (including both function and catalog cards) can be used as a means of user-tailored content packaging and publication. In a preferred embodiment, cards or groupings of cards are published by a user including "interactive" elements.

The publications created using a SNPS can be used with existing social media platforms such as Facebook®, within an independent "stand alone" SNPS, and also in other contexts. The purpose of the invention is not to provide a new social networking platform per se, and the invention can be embodied as a stand-alone platform independent of such networks. Rather, the invention provides a new method of creating and publishing content items, with customized rules, which can be used both in social networking and in other contexts.

In the prior art, publications are made and are available as prepackaged content. Content is typically assigned to a category created and designated by the system according to pre-determined settings which cannot be controlled by normal users. Users cannot fully control the context of the content, how others can interact with it, and to what extent it can be published, re-published, or otherwise circulated among others by others.

With the present invention, however, the user assigns their published content to one or more categories, and can assign rules governing how their content is used and shared (or not shared). Users can also re-publish the same content card with various different contexts. An important advantage of the invention is that the user both assembles and controls the context of their publications. This is in contrast to a typical social media platform where a user loses all control over their content after they post it, and where content is posted piecemeal or in an all-or-nothing manner. User selected rules govern how others are able to interact with the published content, as well as the way it is "published" or "re-published" by others. Users can craft complex publications, presenting a variety of hand-picked content in a customized format and context.

The publication process can include preparing content using card(s), assigning subjects and categories to the content, and defining the permitted interactions by different users and groups. The user can define the interactions allowed between each user/group and/or subject/category (card/catalogue) yani subject=card, category=catalogue).

What precisely is published and publication order are both defined by users. Users may either publish status notifications during time flow, or may publish individual or correlated text, visuals, video or audio content.

Groupings of published objects may be interacted according to functions added by the user, with the content of one card being linked to the content of another card. Users may assign publications to subjects and/or categories.

Published objects may be shared with other users, who may also be permitted to reuse all or part of the publication in their own publication(s). Sharing permissions, or lack thereof, can therefore be part of the rules for user generated publications.

The user decides the functions to be attached to each publication. For instance, they may select from functions such as inviting likes, comments, and/or evaluations from viewers, photo slides, a magazine etc. to be attached to a given catalogue or card. The user may curate and format each publication as they wish, including customizing the page and visual layout.

The interaction of users with each other and/or with published content can be based on relationships between: User/Group→User/Group (i.e. users and groups with each other), User/Group→Card/Catalogue (i.e. users and groups with cards), and Card/catalogue→Card/catalogue (i.e. cards, including catalog cards, with other cards).

Users may access their own publications via a publication page. Users may access and interact with the publications of others (where allowed by rules) via a discovery page.

Figure 2:
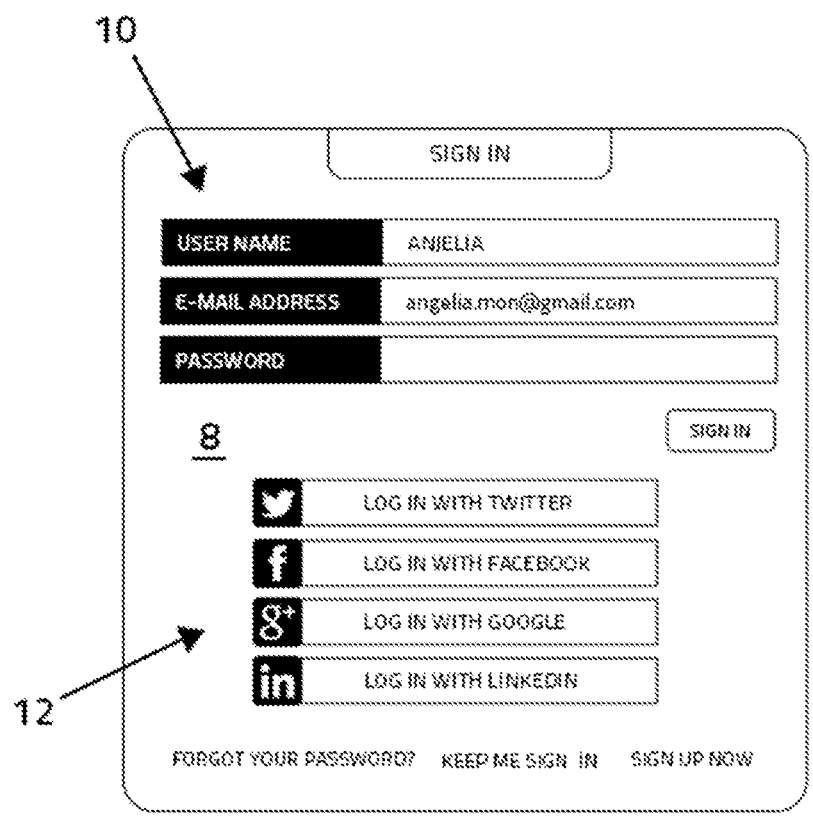
FIG. 2 is a sign-in screen with several sign-in options.
Figure 3:
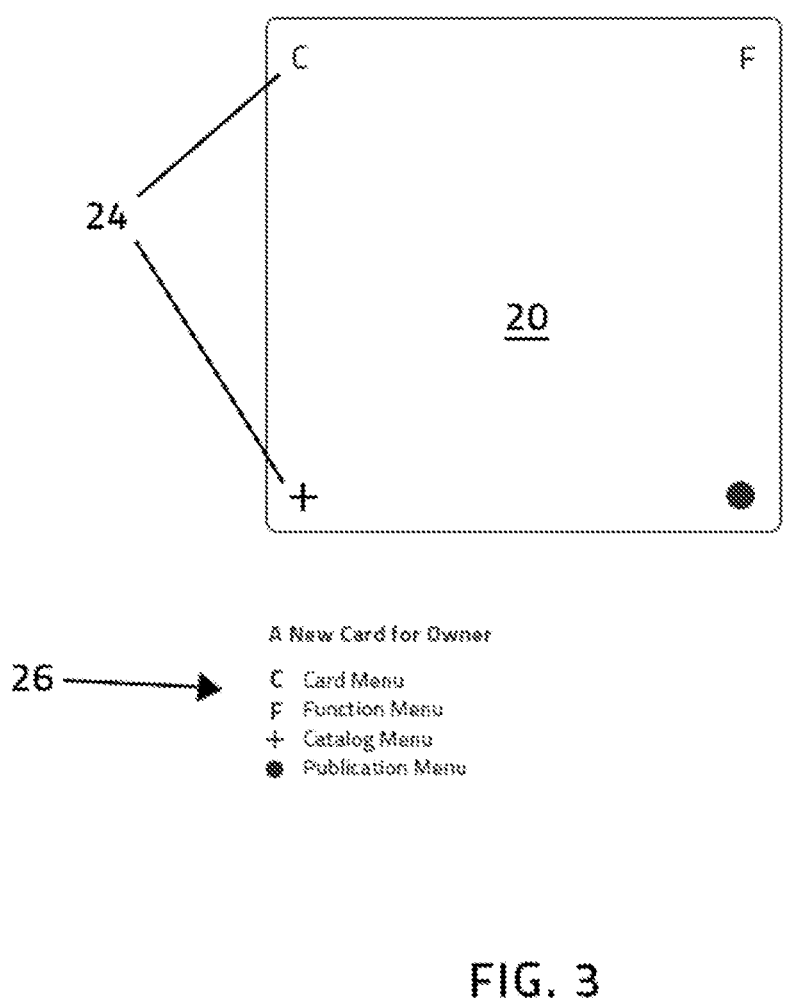
FIG. 3 is a new, blank card.

Referring now to the drawings, in which like reference numerals are used to refer to the same or similar elements, FIGS. 1-2 show welcome and login screens compatible with the invention.

FIGS. 3-18 are "cards" for implementing the invention, including blank cards, nested cards, and the editing process.

Figure 19:
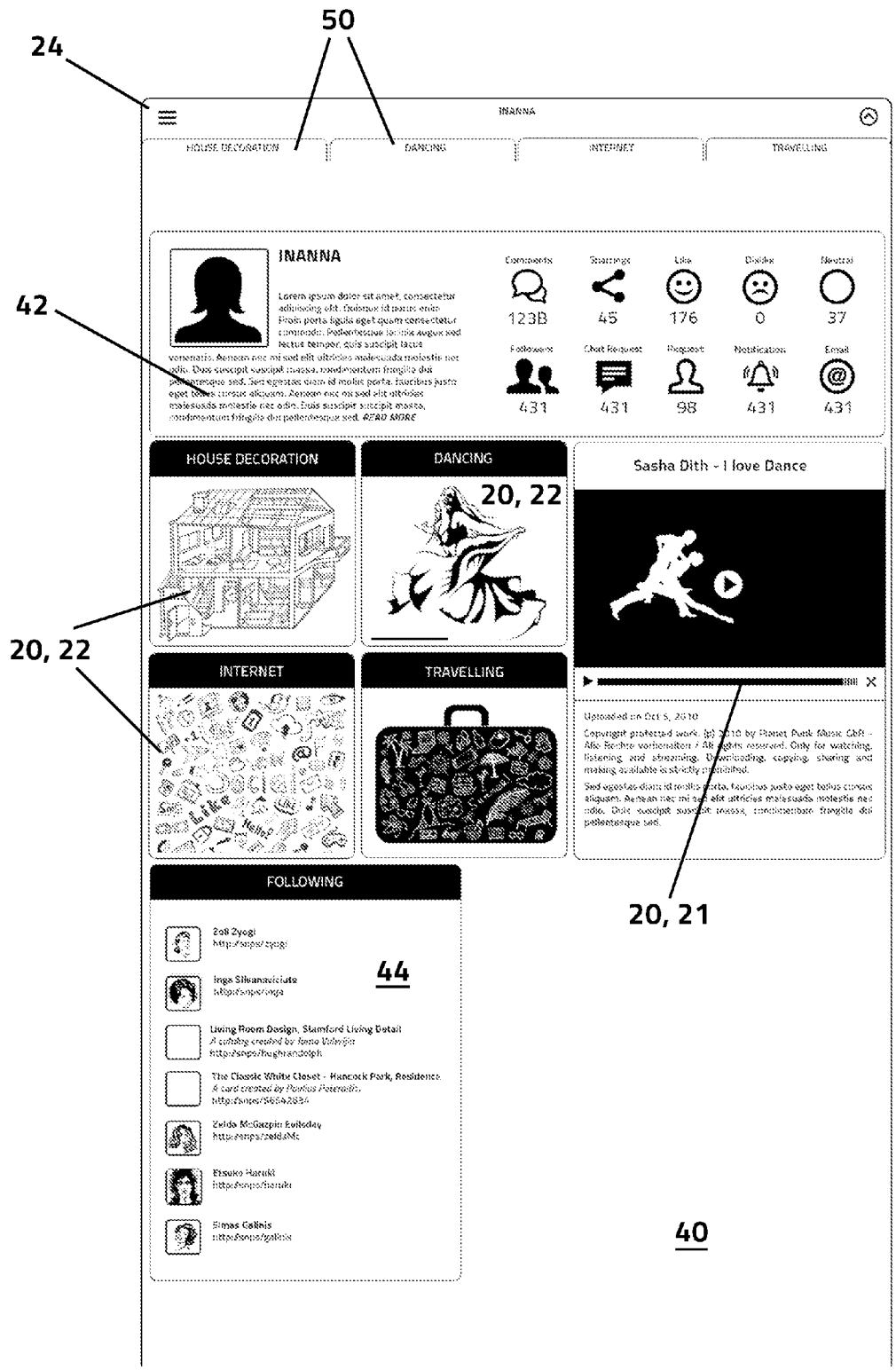
FIG. 19 is a profile page for a hypothetical user.
Figure 20:
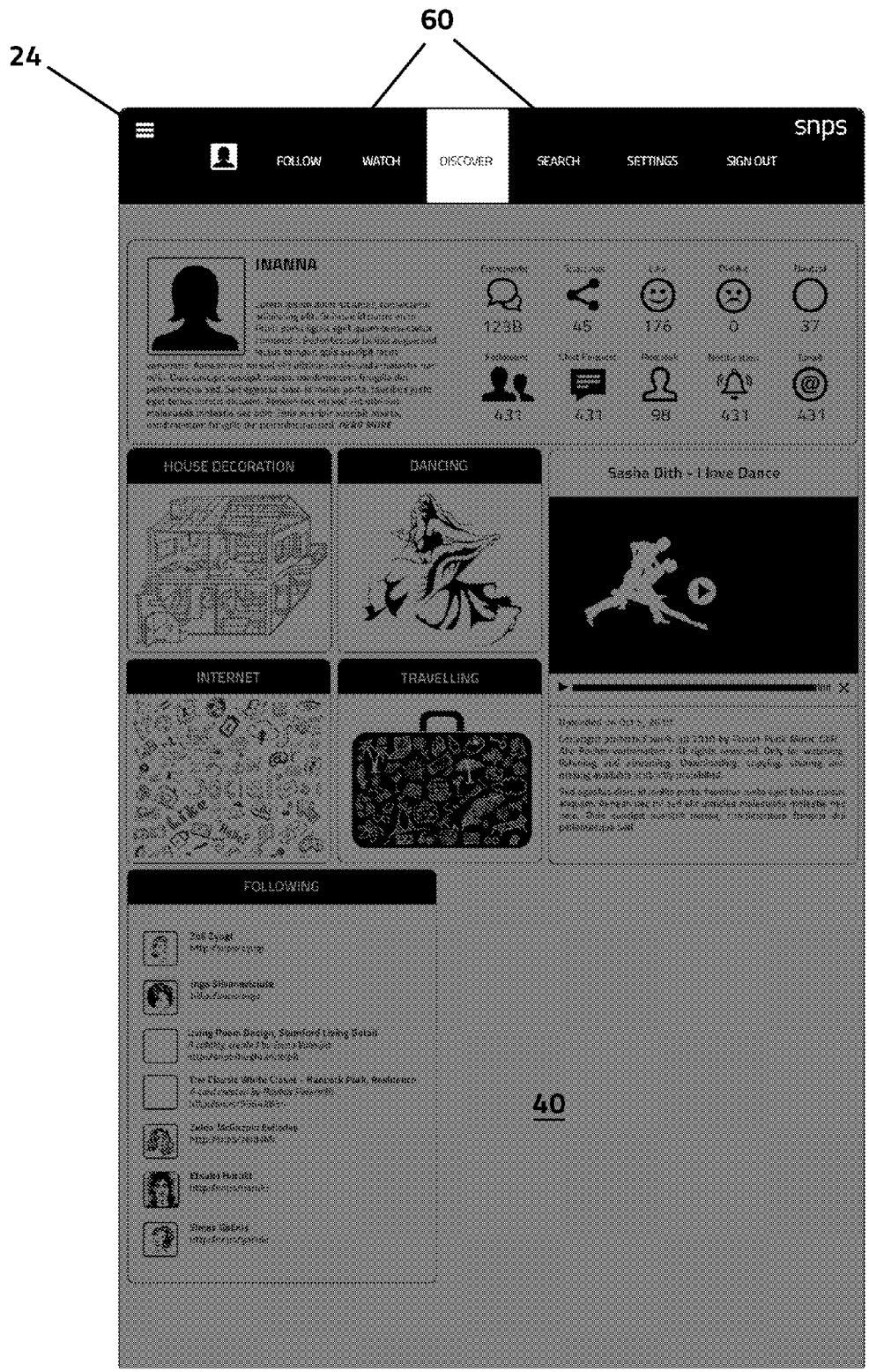
FIG. 20 is a profile page for a user with the main menu highlighted.
Figure 21:
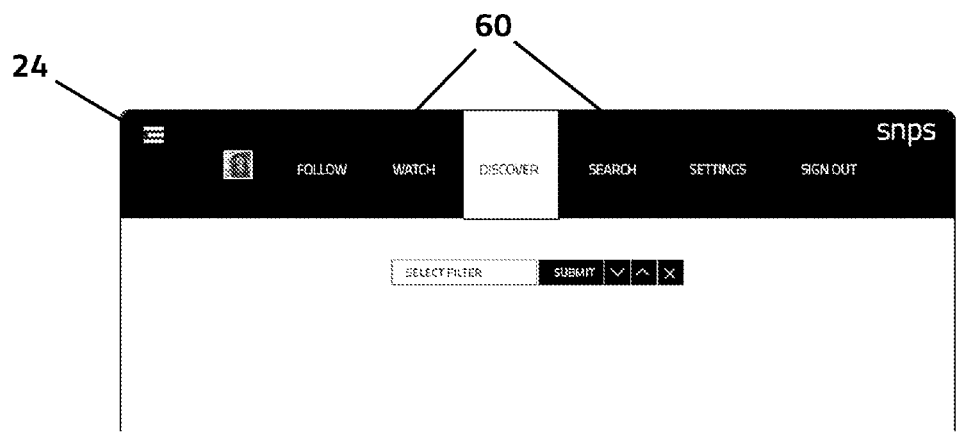
FIG. 21 is a menu with the "Discover" feature highlighted.
Figure 22:
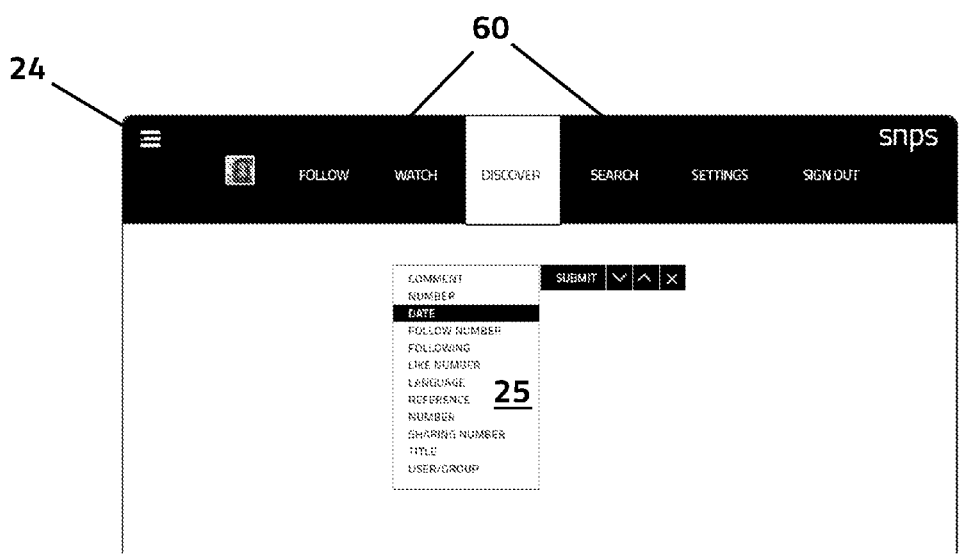
FIG. 22 is a drop-down menu for selecting search filters.
Figure 23:
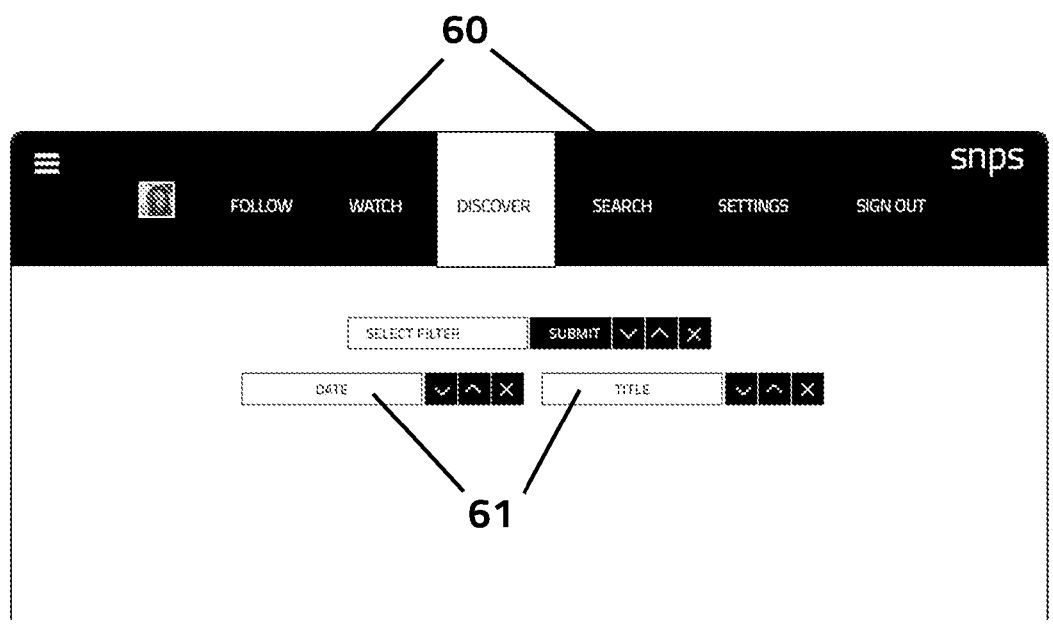
FIG. 23 is a Discover searching page with two filters.

FIGS. 19-20 are an exemplar public profile page for a fictional user Inanna who created publications using cards. The sub-panel for "Sasha Dith—I love Dance" is a function card which includes text and video content. The sub-panels for house decoration, dancing, internet, and traveling are catalog cards which contain and organize other cards.

Figure 24:
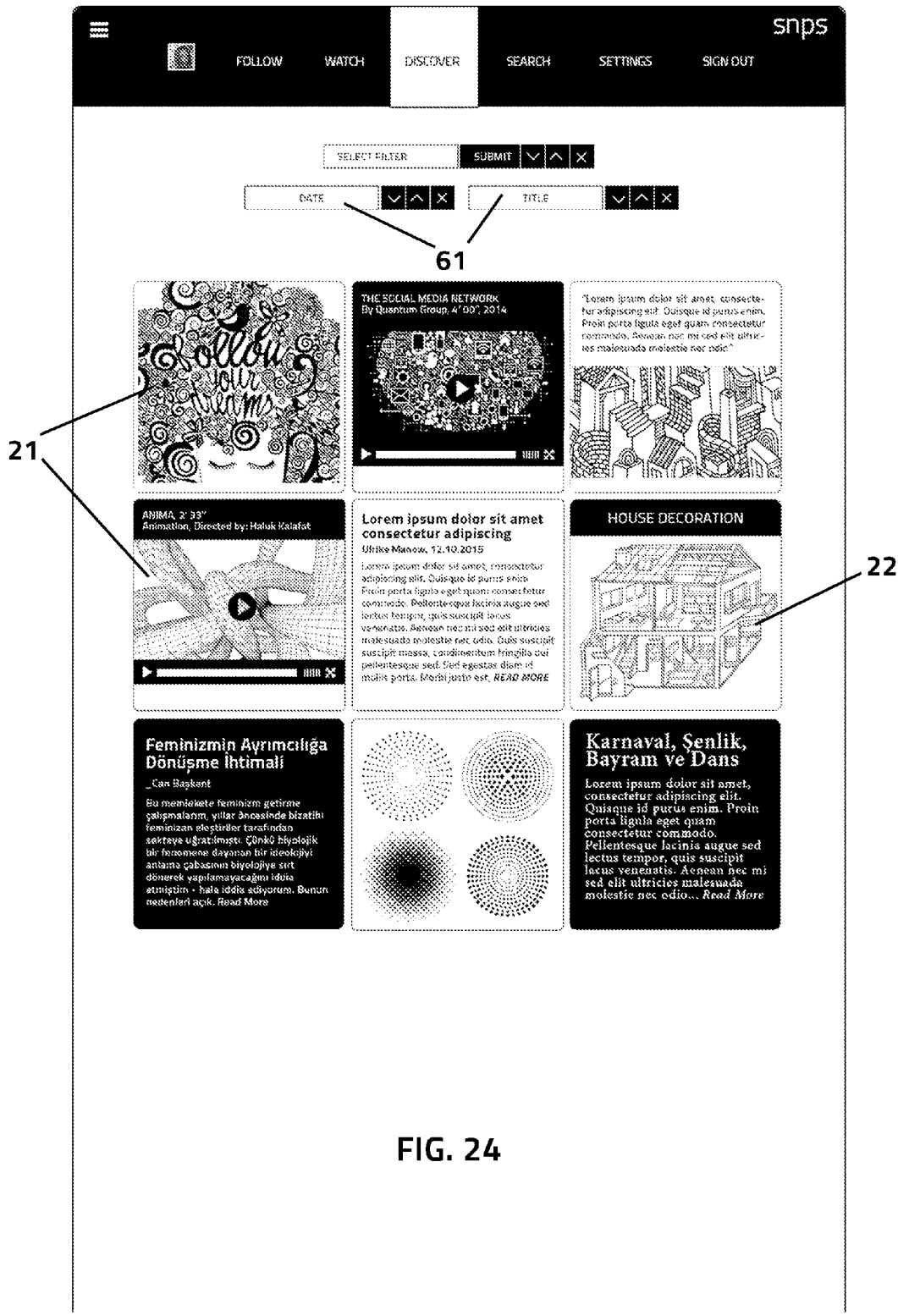
FIG. 24 is a display of search results using filters.

FIGS. 21-24 show a user interface implementing a "Discover" function, including drop-down filter options and search results at FIG. 24.

Figure 25:
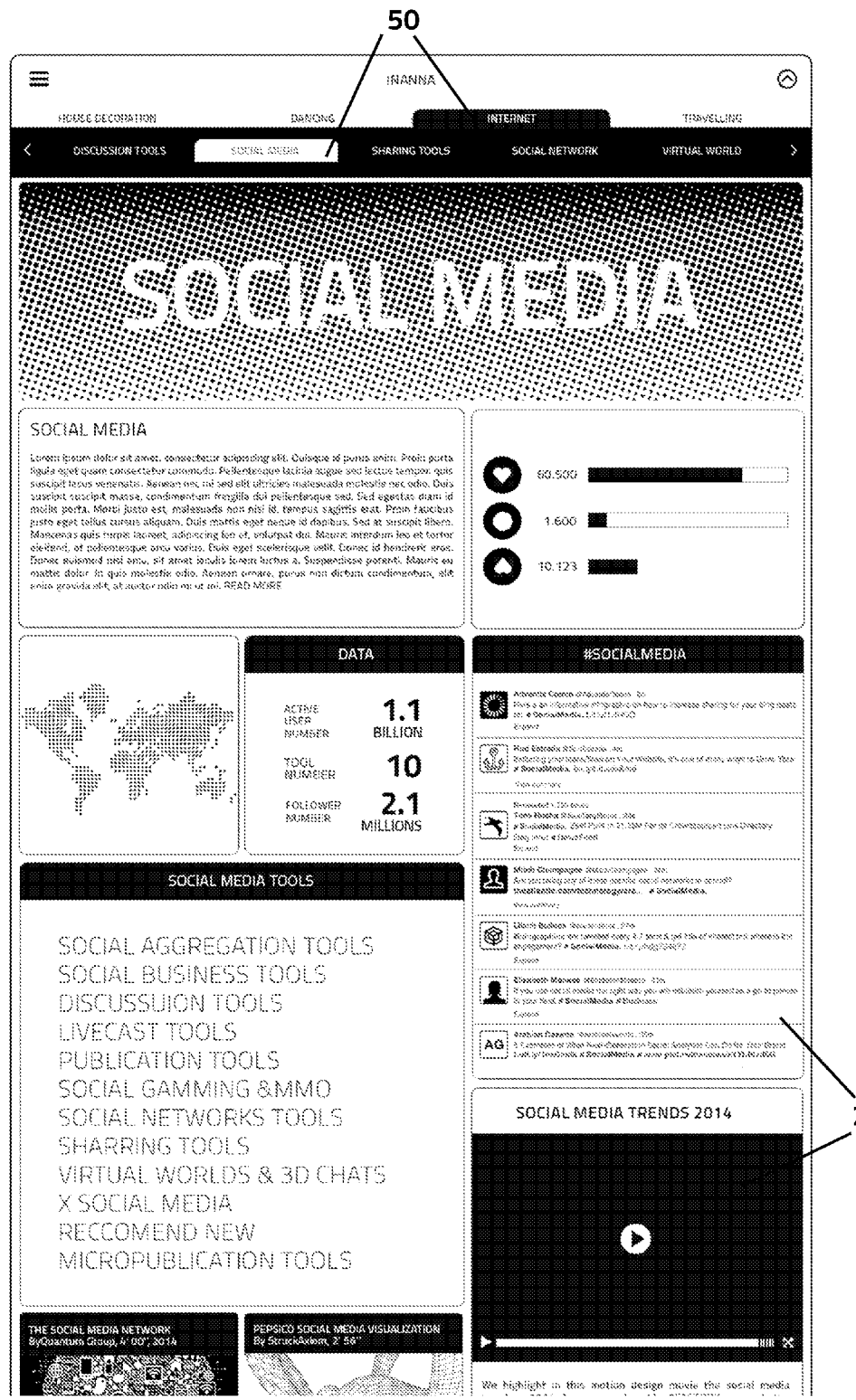
Figure 26:
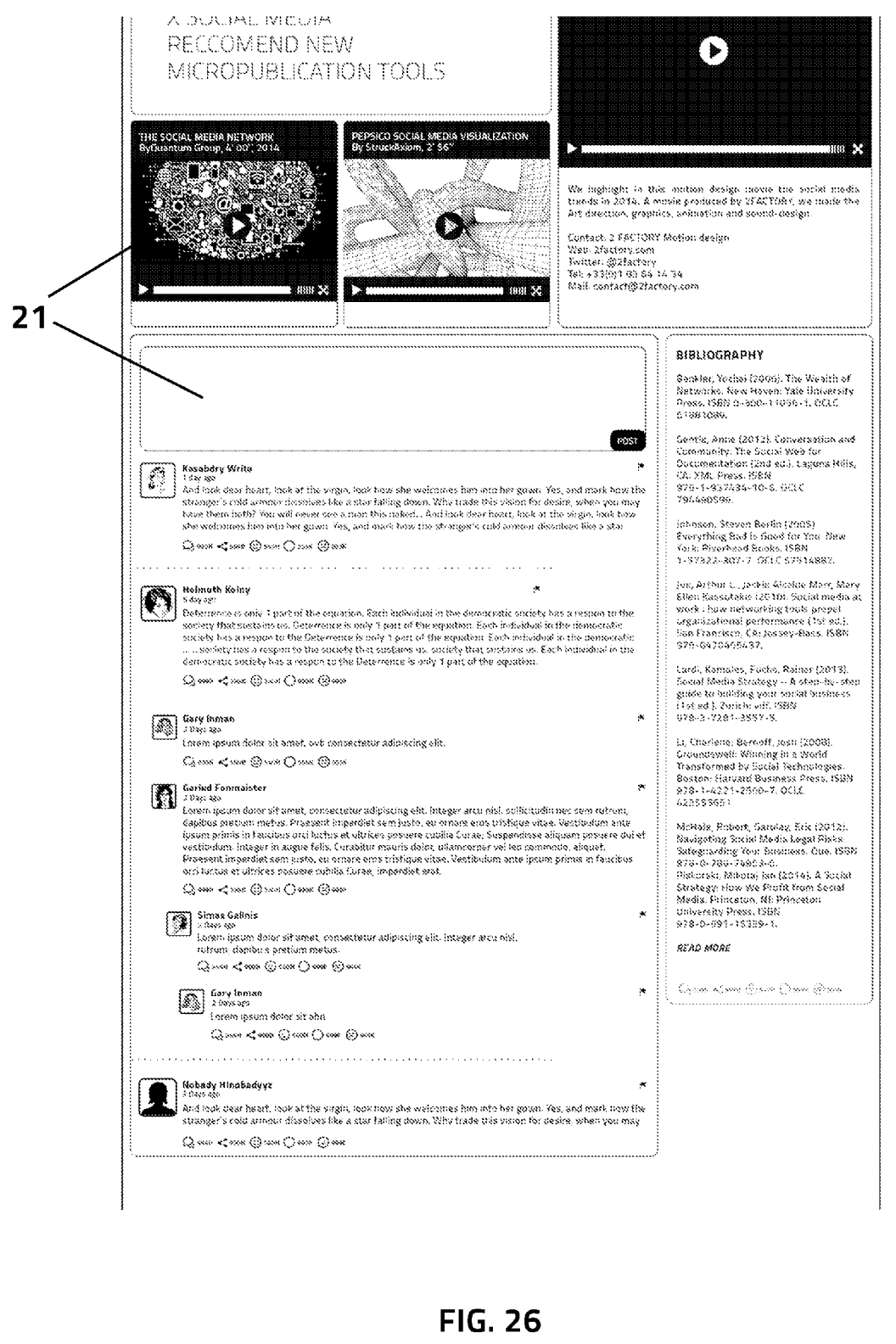

FIGS. 25-26 are the top and bottom of a single continuous screen image. The page shows part of a publication including a number of cards. The page is within the internet catalog card shown in FIG. 19.

Figure 27:
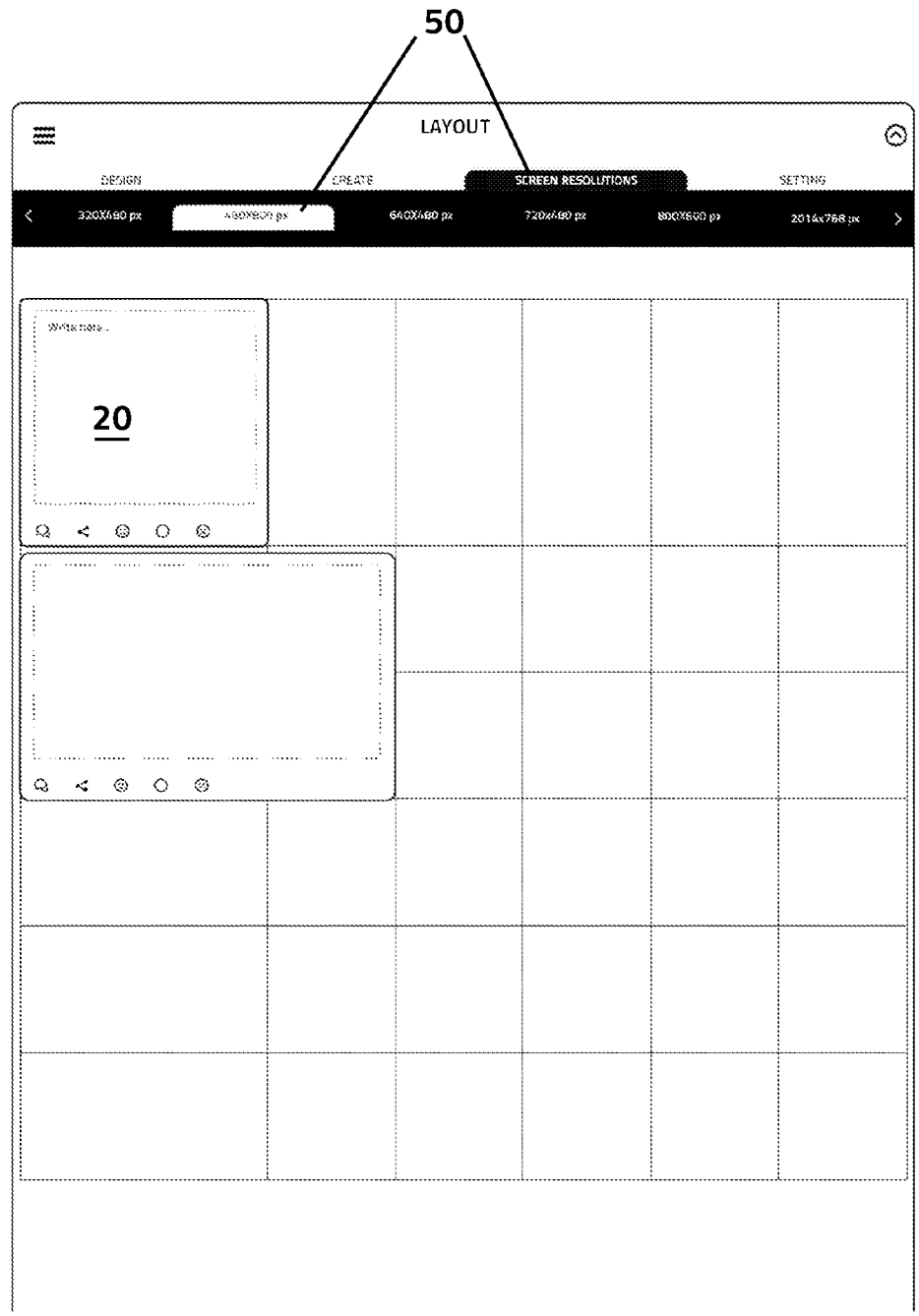
FIG. 27 is a card editing interface.

FIG. 27 shows a screen for creating, defining, and manipulating cards, in this case for a user profile.

Figure 28:
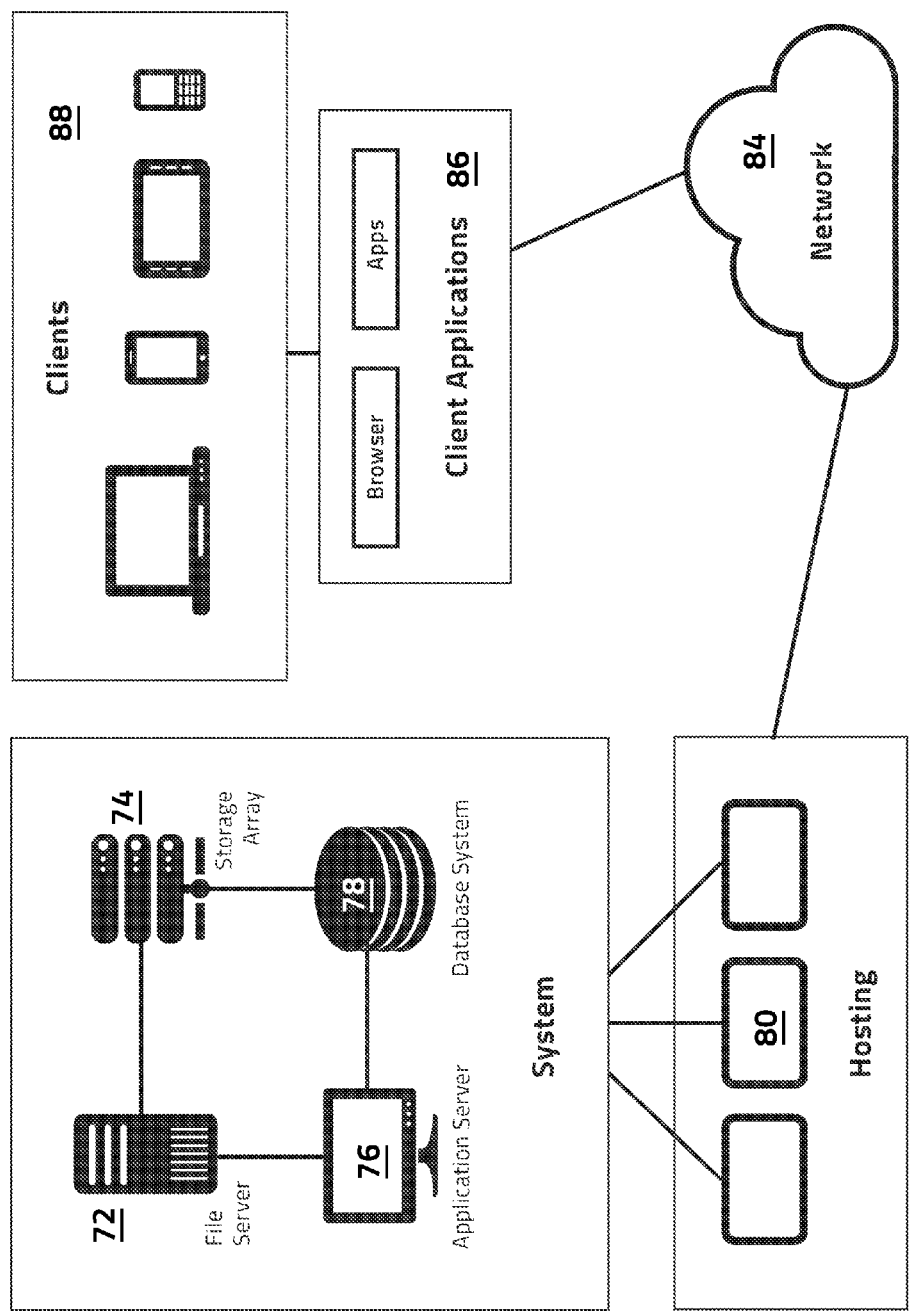
FIG. 28 is a schematic diagram of a physical system for use with the prior art and with SNPS.

FIG. 28 is a general flow chart for a typical prior art social network system, which elements are also usable with the current system.

Figure 29:
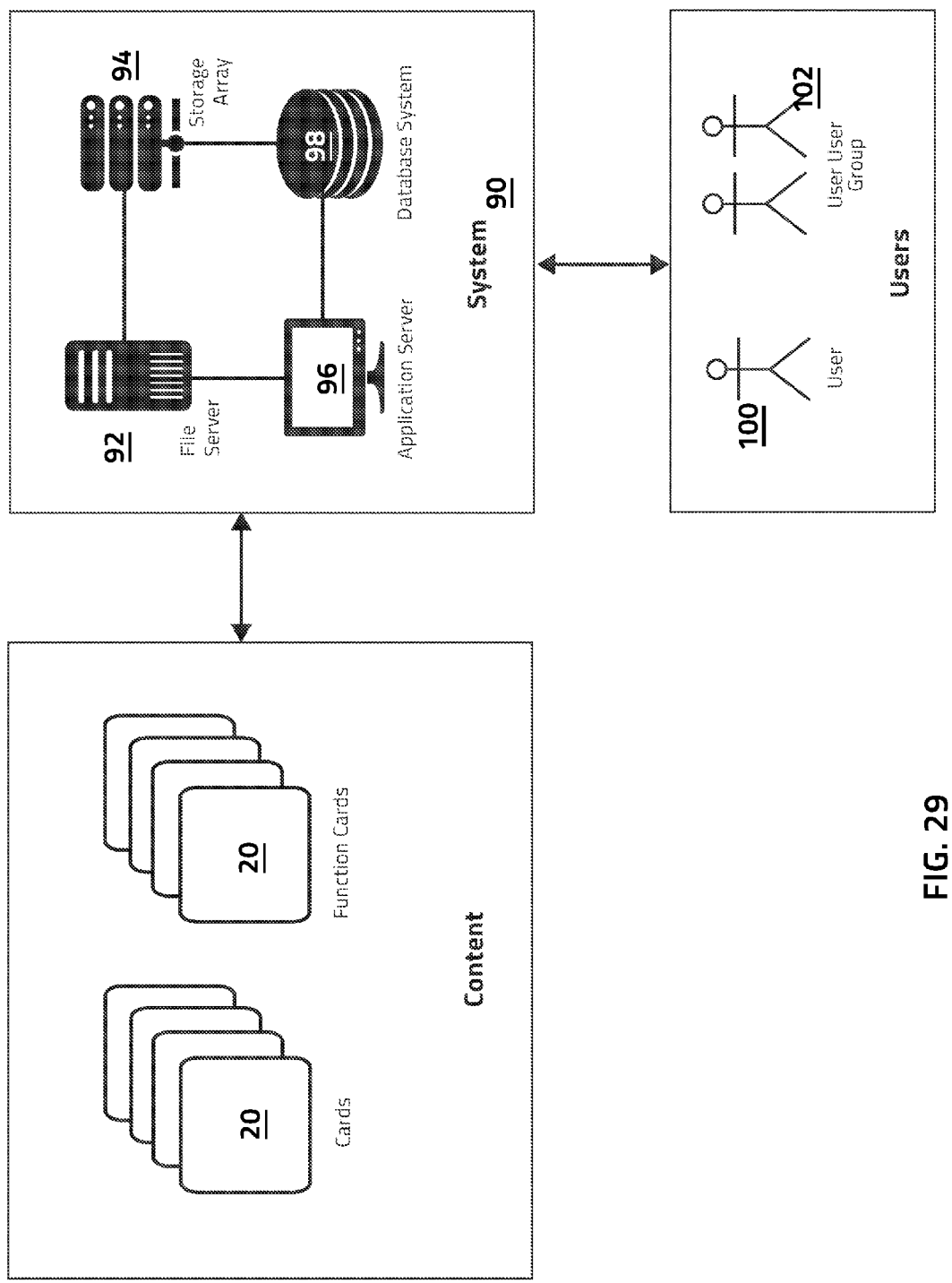
FIG. 29 is a schematic diagram, to be viewed in conjunction with FIG. 28, of the SNPS.

FIG. 29 is the schematic view of a social network system according to the present invention, to be considered in conjunction with FIG. 28.

Figure 30:
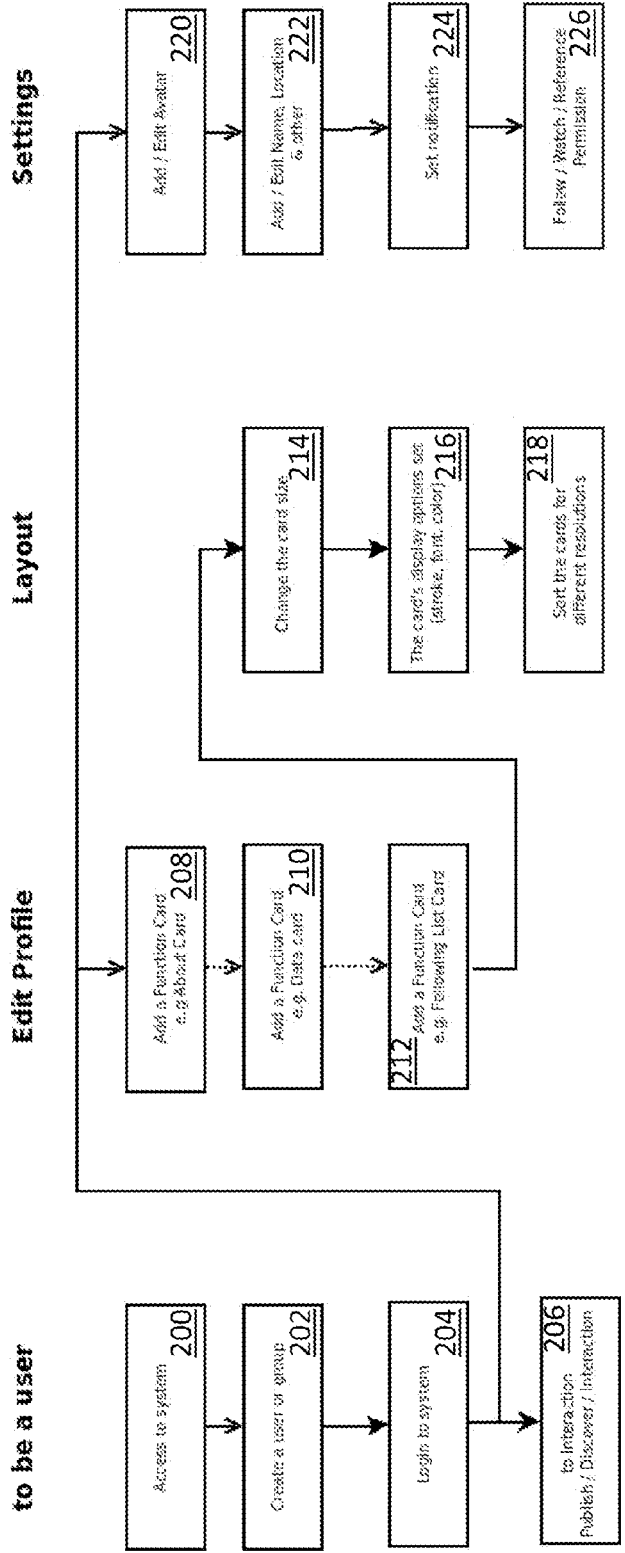
FIG. 30 is a user options flowchart.

FIG. 30 is a flow chart showing how a user might use a social network system according to the present invention.

Figure 31:
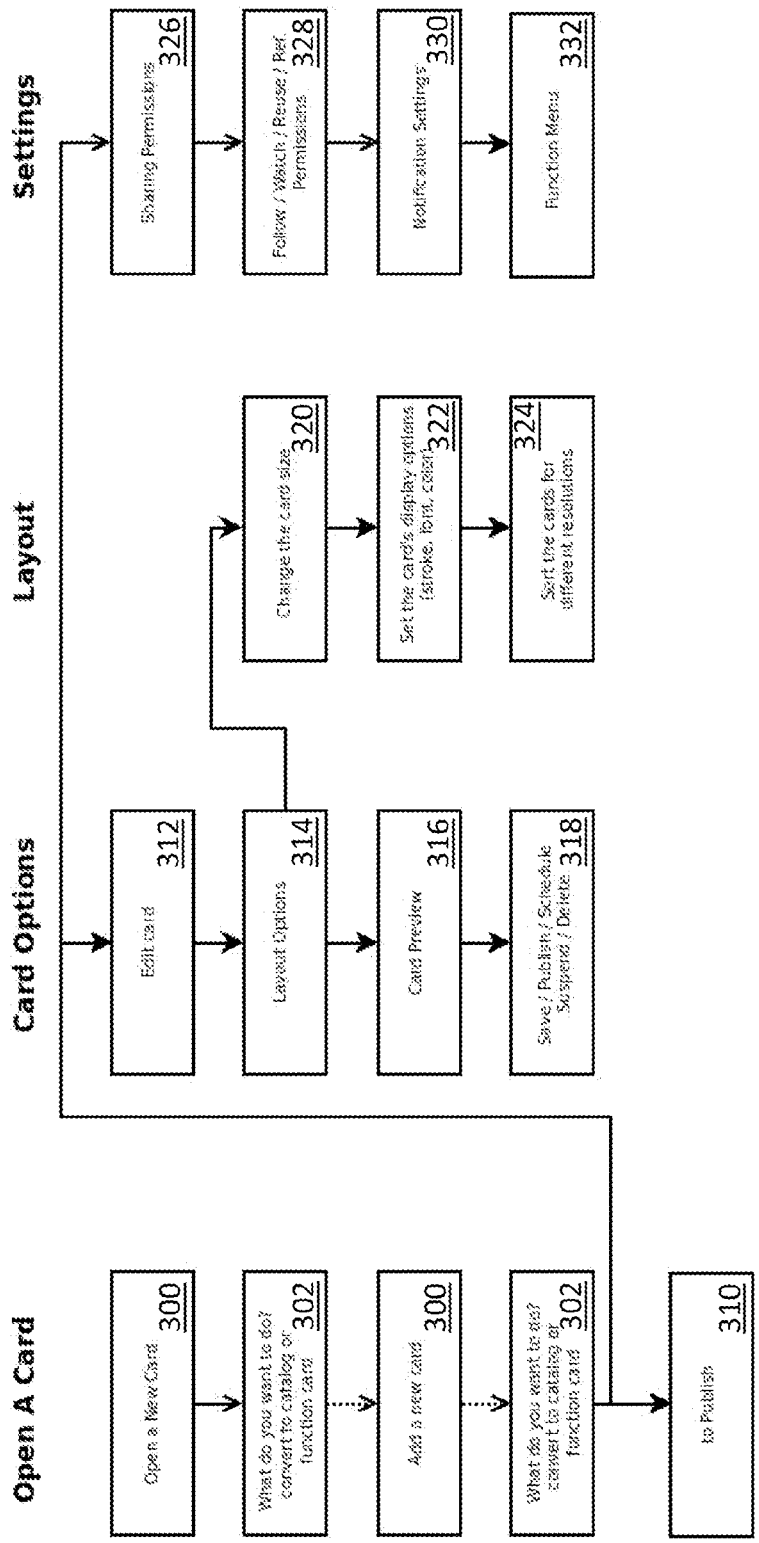
FIG. 31 is a card creation and publication flowchart.

FIG. 31 is a flow chart showing how a card according to the present invention can be created, edited, and published.

Figure 32:
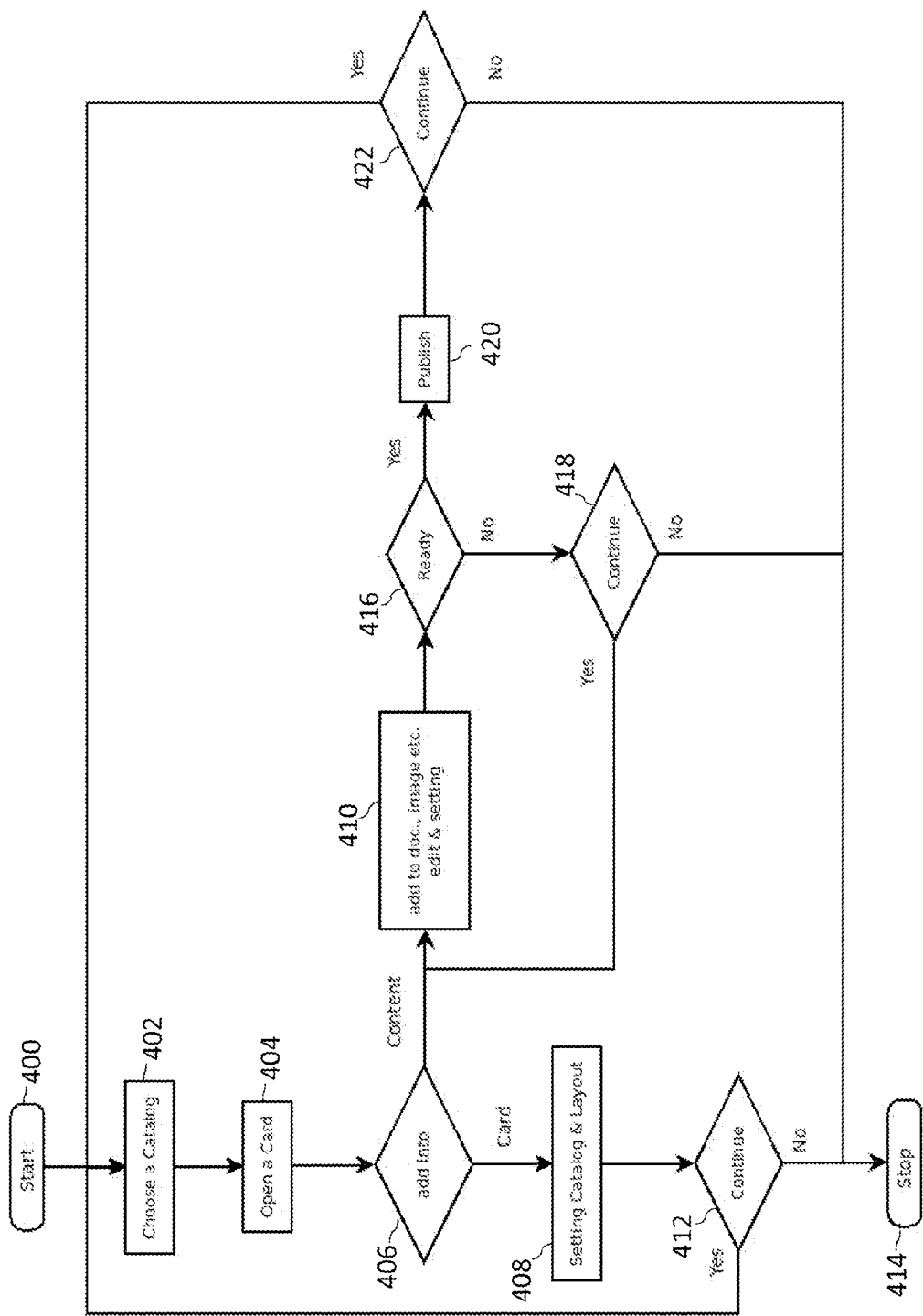
FIG. 32 is a flow chart outlining a card creation and conversion process.

FIG. 32 is a flow chart for a create card and conversion process, and

Figure 33:
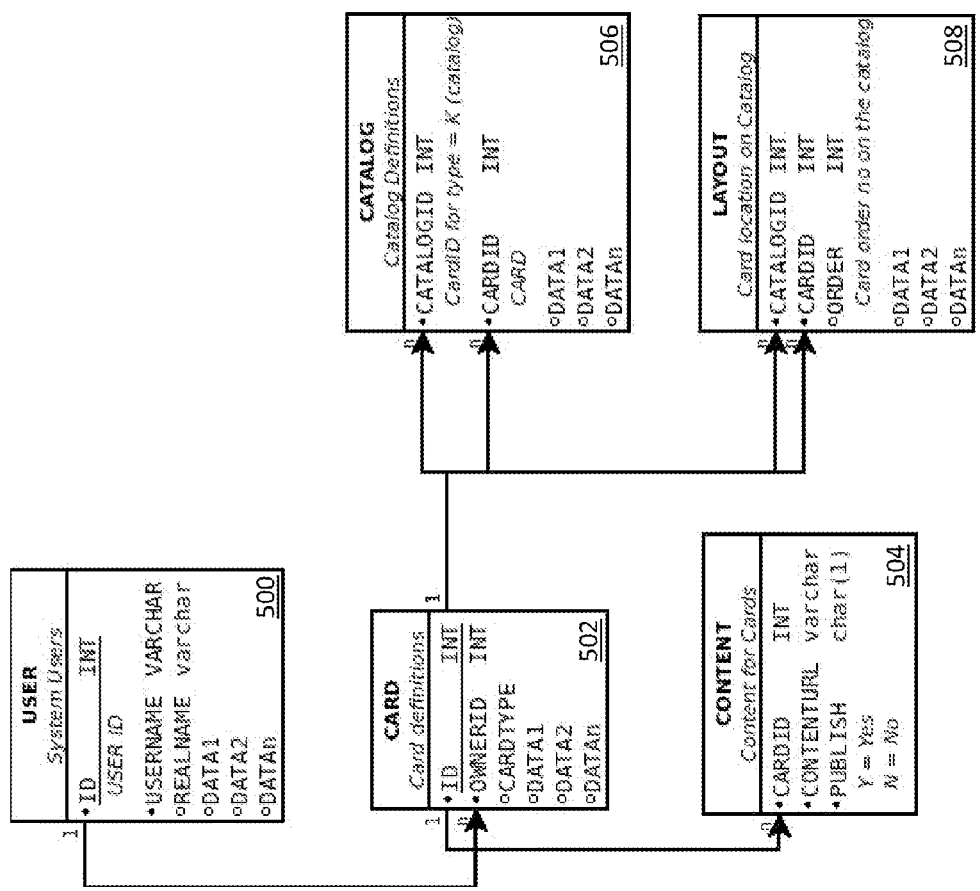
FIG. 33 is an entity relationship diagram for a SNPS card creation and conversion process.

FIG. 33 is a corresponding Entity Relationship Diagram ("ERD") for the create and conversion process.

Setting Up Users and Groups

Users are key to the system, any may be simply a person accessing and using the SNPS. The user may be defined at the chronological starting point of the system, initially through a registration process, and later by logging in the returning user. The system can be accessed via an internet URL or network ID. The registration options can be provided to each person looking to become a system user as described below and shown at FIG. 2. By choosing a registration option the user registers in the system and becomes a user. Once registered, they may publish content, discover and view other publications and users that are in the SNPS, and/or interact with other users and publications. The user may interact with other users' publications including by commenting, indicating like or dislike, and providing ratings and evaluations such as using number and star ratings.

A login screen 8 may be provided. The login screen may include one or more than one option for logging in, such as interfaces for traditional login 10 using names, emails, and passwords, and/or interfaces for logging in through outside programs of social media services 12.

Once logged in, the user may create a personal profile by adding "function" cards 21, including cards with profile information. User profiles can also utilize catalog cards 22. The user may also add Publish/discover/Interaction functionality associated with the profile. The content and interactive elements are displayed on the profile. The user may edit the system settings for interaction with the profile by others.

Preferably users will provide email or other contact information so that they can receive notifications, such as about interactions, from the SNPS. In some embodiments e-mail is provided during registration, which can then be used as a security key or confirmation contact for changing and retrieving passwords, user names, and the like.

A "user name" or user ID may be used at login, as a screen name, and/or as a nom de plume in interactions with other users. By using this security key, the creation of URL or facilitators such as QR (Quick response Code) code can be possible.

Users can create groups, and can distribute, share, or collectively create publications through these groups. User names and emails can also used to create groups, and to create a USER ID for the group. The user creating the group will typically give a name to the group.

A confirmation or activation email regarding the new group can be directed to the e-mail of the user who created the group or to the user(s) that is are appointed as administrators of the group. There may be more than one administrator, and in that case the activation email and notifications can be directed to all administrators. Typically administrators are responsible for the publication, archiving, organizing, removing, and notifications relating to group content. The administrators can be replaced or deleted.

In some embodiments, notifications related to the group will be directed to the e-mail of the user who created the group, to all group administrators, or to all members of the group, depending on preferences.

Authorized users in a user group may add and organize cards for the group page or group publications. The user may set authorizations for themselves and for the cards they create in the context of the group. Their authorized interactions with the group and/or the authorized interactions of others may adjusted be via a group settings menu. Relevant parameters may include group subscription status (following, notification, chatting, etc.), visibility/use status (reuse, watch, reference, share content they contribute to the group, etc.), and notification settings.

Editing Profiles

Users can introduce themselves on their profile pages by using function cards 21, which may include contents (i.e. a "content card") they create or select. Users can define the way they and their profile will interact with other users in SNPS.

For instance, an "about card" (a type of function card, like all non-catalog cards) can be selected or created using the user's registration information, an avatar, user name, user URL, total likes/dislikes, interests, groups, total registrations, total content available for sharing, etc.

An interactive "chat card" can also be selected to allow instant messaging. A like/dislike showing the user's likes, dislikes, and/or reviews is also possible. A "comment card" invites and saves comments on the profile page. These are only a few examples of interactive cards usable with the system. Cards 20 usable with profiles can also be used with publications and elsewhere, and vice versa.

All these functions can be added or removed at user's option because the profile page is designed by the user. The user may add numerous cards to their profile page. See FIG. 19.

Profile Layout

The user may organize objects in their profile via a "Layout" function. See FIG. 27. This functionality can be used to add, remove, and arrange cards including interactive and content (functional) cards in the profile. In particular, interactive cards on the profile page can be used to communicate with other users.

It is preferably possible to select, arrange, and design the profile cards. Options include the card size, display options, and sorting of the cards. The layout of the cards is customized by the user for various apparatus and resolution as far as size, order and appearance (color, font, stroke, etc.) are concerned. The page of the user can have a custom made layout with this feature.

FIG. 27 is a layout interface for arranging and formatting cards. This type of interface could be used for formatting user profiles, or for formatting other types of publication.

User Settings

An e-mail address and a user name may be required to log users and groups into the system. It is up to the user to select either a real name or a nickname. Users and groups may select one or more avatars or profile photos. They may also organize their profile by user name, real name, an access facilitator (URL) etc. User names, real name, and avatars can be used in user interactions. The email addresses of the users and groups may be hidden from the public. Communications and interactions between users and groups may also be hidden some or all of the time.

Notifications for certain events such as comments and communications may be controlled via system notification settings. Notifications related to the interactions of users, groups, and/or content, system notifications can be customized by the user and notification settings are the top level settings. If no separate notification setting is selected for "one to one" communications, the user level settings (main menu settings) will be govern by default.

User settings can control the ability of other users to view, share, and on the user's profile and publications. Such settings may be used as default settings for all publications by that user. The SNPS can also provide default settings for user settings for when the user chooses not to customize them. Settings can control the user's visibility to other members who they are connected with or not, and their visibility in SNPS searches.

User Actions Flowchart

FIG. 30 outlines steps and functions typically available to users of the SNPS. The user accesses the system 200 via the internet or otherwise. They then either create a new user account, or log in to a previously existing account. See also FIG. 2.

Once logged in, the user can proceed to use the discover function to find cards of interest 206 and/or interact with the cards of others 206.

The user can also create new cards 208,210,212 as part of their own profile or otherwise. "About" cards, "data" cards, and "following list" cards are all useful, for example, in user profiles. See FIGS. 19, 25-26, and 30. Once a card is in place the user can change its size 214, its font, stroke, and color 216, and adjust its resolution 218 for use in different screen contexts. The user can also adjust permissions for each new card or set of cards. Different cards in the same project or publication can be given different permissions and/or default permissions can be selected which apply to all cards unless changed.

In some embodiments the user can also edit their profile without adding new cards. They can add a picture or avatar 220, add basic information like their name and location, and adjust their notification settings 224. See also FIG. 19. The user can also adjust the default permission settings for all of their cards and for their user profile 226. This can include "follow", "watch", "reference", and "sharing" settings.

The flowchart should not be considered limiting the available order of steps.

Cards

"Cards" 20 are the second main elements of the SNPS system. Cards can be catalogue cards 22, or function cards 21 (which include content and interactive cards). Various cards can be watched, followed, shared, evaluated, and liked by other users to the extent that those actions are allowed by the user who created and owns the cards.

Each card can be formed to hold selected content, and also defined according to one or more functions, such as interactive features. Thus, a single function card can potentially be both a content card and an interactive card at the same time. Registered users create cards, and can then publish the card(s) and/or archive the card for future editing, publishing, etc.

At the option of each user and/or each follower, published cards can be monitored based on a timeline or subject index. Preferably, a user can configure a card, or their SNPS account generally, to record and/or report information about how the card is viewed, shared, and interacted with.

Individual objects or subject groups (groups sometimes being defined by substantive categories) can be used as "social network" objects either individually or in a group.

Card size, sorting, colors, order, and layouts (both within and between cards) can be set by the user. The location and size of each card on the page or in a publication can be tailored for different display sizes and resolutions. For example, different layouts, sizes, and resolutions can be designated for use with full size computer screens and for smart phones and other small screens.

Each card 20 can preferably be converted to an independent object that is accessible independent of the user-owner by an alias/URL coupling. This access can be limited according to permissions set by the owner when the card is defined and published.

Serial/function integrity can be provided by subordinating the cards to each other.

Catalog Cards

Figure 4:
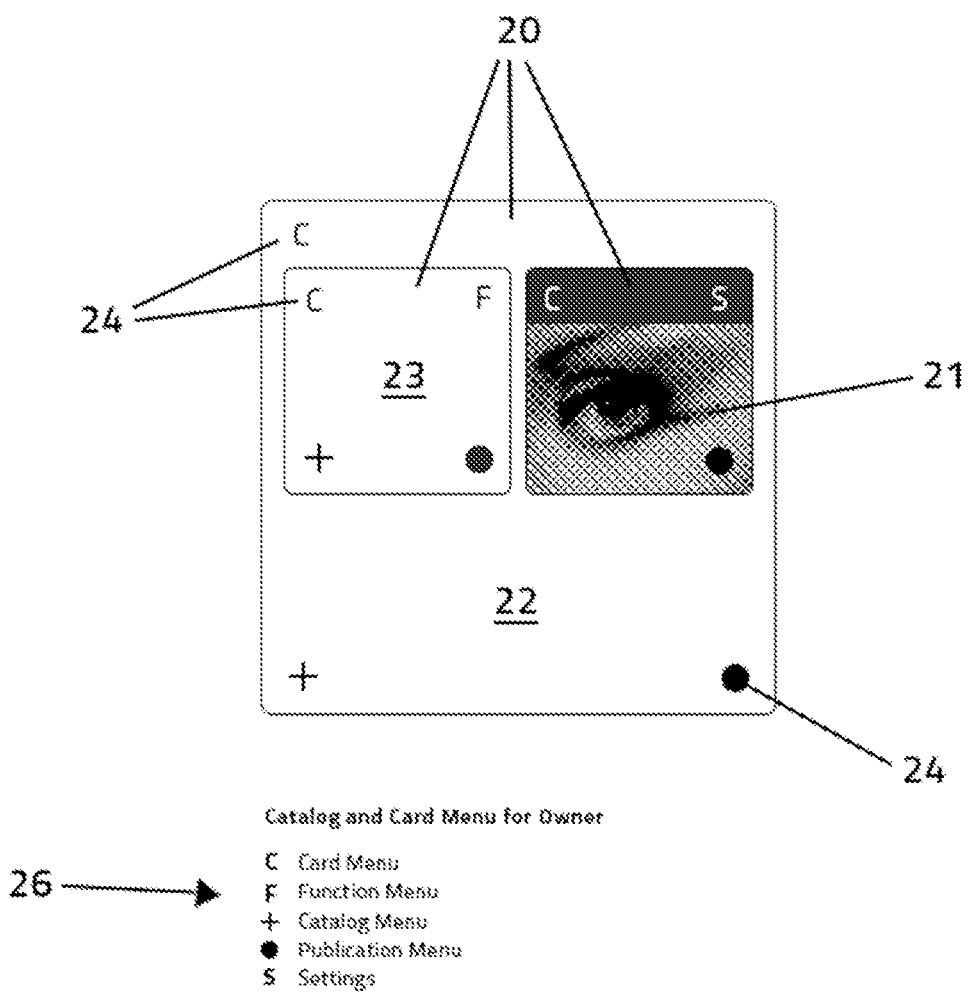
FIG. 4 shows two cards nested within a catalog card (with a menu)

Catalog cards 22 (also just "catalogs") contain other catalog cards and/or function cards, and are used for grouping and organizing cards for publications. In FIG. 4, the large outer card is a catalog card 22 holding two other cards. A catalog card can takes on defined actions if it contains another card 20.

In the example embodiment, a "+" icon is displayed and enabled when a user is editing a card that has the potential to be made into a catalogue card. See FIGS. 3-7 which include the "+", compared to FIGS. 8-18 which have been designated as function cards and so do not show an "+".

Each catalog card 22 may contain one or more other catalogs, in addition to function cards 21. This is somewhat analogous to folders, sub-folders, and the files they contain in computers. This feature can be used to intuitively and effortlessly create a nested, hierarchal organization for publications. Users may create as many catalogs as they wish and arrange them in their preferred configuration.

Catalog cards may be enriched by adding both other catalogs 22 and function cards 21. Published catalogs holding function cards (about, content, like, evaluation, comment, etc.), can provide social network type functions such as inviting feedback and evaluation, publication sharing, and other interactions with viewers.

In the most preferred embodiment, cards 20 which the user defines as having "functions" 21—typically interactive and content presentation cards—are never simultaneously defined as catalogue cards 22.

Cards, including both function and catalog cards, can each be within more than one catalog. This can be both hierarchal (card is within a first catalog card, which is itself within a second catalog card) or lateral (the same card is present and accessible in more than one catalog).

Function Cards

Function cards 21 include content cards and interactive cards. Each function card can be designated by a user to hold content, and/or also to perform one or more functions, such as interactive features. Thus, in some embodiments, a single function card can potentially be both a content card and an interactive card at the same time. Function cards created by users with a function can have individual, stand-alone functions, or functions that are connected to another card or a catalogue. The card in the upper right of FIG. 4 contains a picture, and is a content-holding function card 21.

Cards which have been made into function cards preferably will not have a "+" icon, and cannot hold other cards in the way that catalog cards do. See, for example, the function card in the upper right of FIG. 4, which lacks the "+" present in the other two cards.

Function cards can take a wide variety of forms, including examples not enumerated in this application. See FIGS. 9-17. A single functional card will often have both interactive and content elements, and it is not always necessary to distinguish between the two.

The function card 21 examples provided are illustrative and non-limiting. "Slide cards" 28 (see FIGS. 13-14) are function cards which allow viewers to "slide" between different content, such as different photographs or songs. More conventional content cards can display documents, a video player, a music player, images, text, a rebroadcast or republication of content in a different card of another publication, or other content. Interactive cards could include a comment card, a calculation card, slide cards, about/informational cards, etc. About cards, data cards, and following list cards are all useful, for example, in user profiles. See FIGS. 19, 25-26, and 30. The user may add any functional feature (comment, like, critic) to the each card as much as they wish.

Users can add, remove, and arrange a theoretically limitless number and variety of content cards, optionally bundled and sorted using catalog cards, as the user prefers. Typically a set of function card functions will be pre-defined for easy use in a SNPS. In preferred embodiments it will also be possible for a user to add or import new attributes, functions and card types for use with a SNPS.

Creating New Cards

Once a user logs into a session or joins the SNPS, their next step will often be to create or "open" a new card 20, either to start constructing a new project (i.e. future publication), or to add to a project they were previously working on. See FIG. 3.

The user's new card can be used to create profile information, to create a catalog, to create a content card, or to create a function card. Embodiments where catalog cards which hold other cards also have function elements (content, interaction modules etc.) are allowed within the scope of the invention. Although numerous catalogue cards can be created, due to the control and management difficulties, a modest number is preferred.

A new card is created by an "open a new card" step. A user can create any number of cards, and those cards could be opened in a catalog. The user can start a new publication with the first opened card, converting it to either a catalog card 22 or a function card 21. In practice it will often be easiest to begin with a catalog card, and then add cards within that catalog. However, initial and subsequent cards may also be created without having a catalog. The user can set layout, appearance, and publication/sharing settings for the cards, as appropriate.

In a preferred embodiment, menus 25 and/or buttons 24 to open menus are displayed on the cards to allow card editing. In the examples shown in FIGS. 4-18, icons 24 or buttons 24 to reach various menus 25 are placed at a corner of blank cards 20 and other cards available for editing. Keys 26 explaining the various icons are below the cards.

Icons 24 and menus 25 are preferably automatically added and removed from cards, by the SNPS, based on the options available for each at a given moment. In FIG. 4, for example, three cards 20 are visible, two of which are within the third. The card on the upper right has been changed to a functional card 22 displaying a photograph, and so is no longer eligible to be a catalog card. The card in the upper right therefore does not have a "+" icon 24 to turn that card into a catalog. The large outer card is a catalog card 21 (holding two other cards) which is no longer eligible to be a function card, and so lacks an "F" icon in the upper right to add functions. The blank card 23 in the upper left retains both the "+" and "F" icons 24, however, because it has not yet been designated as a function or catalog card, and remains eligible to become either of the two.

Content which is categorized or organized (for instance magazine, newsletter, radio program, video channel etc) can be served as "open" (not as a file) and is readable/visible/watchable/audible.

Card Menu for Card Owner

A "card" menu typically provides card handling options other than adding functions to a functions card. See FIG. 8. The views of and options for a given card will typically be different for the owner of the card and other users viewing the card, such as followers.

Options presented to a card owner in the card menu may include edit, preview, delete, save, publish, schedule, layout, and suspend. Other functions which are independent from the elements of specific cards are preferably presented elsewhere, such as in a separate user settings screen or menu.

Card menu options for the owner typically include some or all of the following:

Edit: Each card has a unique identification (ID). The user can, at their option, give a name to the card, attribute a definition for each card to access the card by URL, attribute a definition such as QR (Quick Response Card) code to the card for easy access, and/or add an abstract or description of the card.

Preview: View the card(s) as they would appear after publication in their present state.

Delete: Irrevocably delete a card, published or not. Alternatively, published cards can just be withdrawn from publication, with the option to edit the card and/or republish the card later.

Save: Save the card, including all of its settings and any amendment or revision. Preferably the user is reminded to save the latest version of all cards after revisions and/or before ending a SNPS session. The SNPS may also be set to automatically save cards at certain times.

Publish: As soon as a card or set of cards is complete, they can be published, typically be the card's owner. The published card(s) will be considered a "publication", although it may appear the same or nearly the same as the original card, depending on the settings selected by the owner. A "publication" may simply be a card which has been released to some or all of the SNPS using public. Cards can be published individually, or as a set. In one aspect of the invention, a number of function cards organized within one or more catalog cards are published together to form a complex publication. See FIGS. 19 and 25-26. Such a complex publication may have multiple levels and sub-levels, and include a variety of function and content sorted by categories, topics, sub-topics etc. See FIGS. 19 (top level) and 25-26 (two layers down). This flexibility and control over how content is packaged and made available in user publications is an advantage of the invention.

See, for example, FIG. 19, a user page for hypothetical user Inanna. The "Sasha Dith—I Love Dance" module is a single card and could be its own publication. The four modules at center left—House Decoration, Dancing, Internet, and Traveling—could be publications of catalog cards which each contain sub-cards according to category. FIG. 24 shows sample search results displaying publications based on single content cards 21 (e.g. the two video cards) as well as publications based on catalog cards 22 holding other sub-cards 20 (e.g. House Decoration), and which therefore have hierarchal levels.

When the card is published, the SNPS assumes that it is ready as far as its function and content. Preferably, if the card(s) are incomplete or otherwise not ready to publish the user will be notified and/or prevented from publishing. As long as the card remains "published", revision of the card will typically mean a new version of the card is created for editing, while the original card remains. Published cards can also have their publication "suspended" by the owner, either permanently or for revision and republication. Published cards can be viewed, opened, manipulated, interacted with, copied, and republished (or not) by other users to the extent defined by the card permissions set by the card owner. Permissions may vary for different viewers. Permissions for each card (and the resulting publication) are typically defined in a settings menu. Each user-owner may have default permission settings applicable to all of their publications defined in their user profile.

Schedule: Starting and terminating dates may be set for each publication.

Layout: The layout tools allow the user-owner to edit the size of the card, and visual features such as stroke, color, font, etc. The layout tools can be used to configure the card for use with different screen resolutions and screen sizes, such as desktop computers vs. smart phones. Different resolutions, font sizes, layouts, and other aspects can be selected for different devices and contexts. (see FIG. 27)

Suspend: Published cards can also have their publication "suspended" by the owner, either permanently or temporarily, possibly for revision and republication. A suspended card is normally not available to users other than the owner of the suspended card, and any teammates if applicable. However, if certain permissions such as "reuse" or "reference" were given for the published object, suspension of publication and card deletion may be prohibited because such suspension or deletion could harm uses of the publication by others. Where suspension is not available, a "hide" button which removes the publication from the publication stream of the user, without withdrawing it from other uses elsewhere, may be available as an alternative.

Cards in draft and suspend status are unavailable for viewing and interaction by users other than the owner.

Hide: It is possible to hide a published card from selected, or from all, followers and/or watchers. A hidden card can remain technically "published" while remaining invisible and/or inaccessible to all users other than the owner-user who created the hidden card. Hidden card can be un-hidden by their owner to become accessible to other users.

Card Menu for Followers

Figure 16:
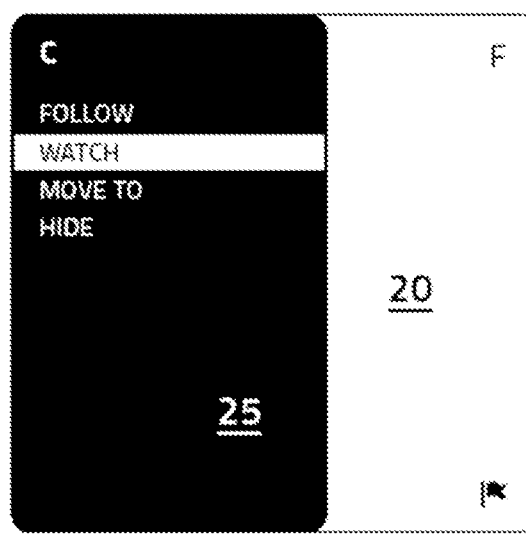
FIG. 16 is a card menu for a follower.
Figure 17:
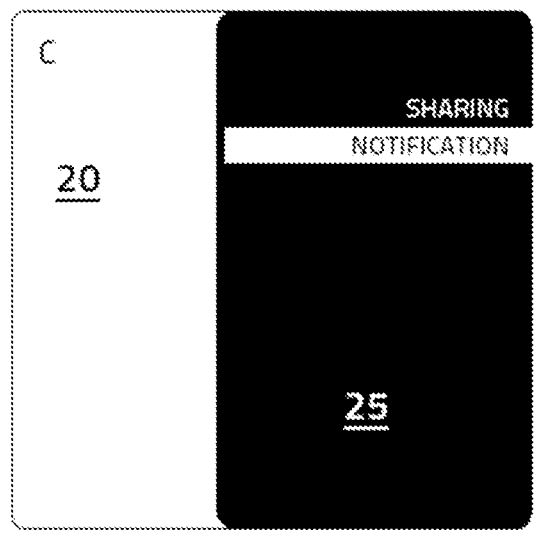
FIG. 17 is a function menu for a follower.
Figure 18:
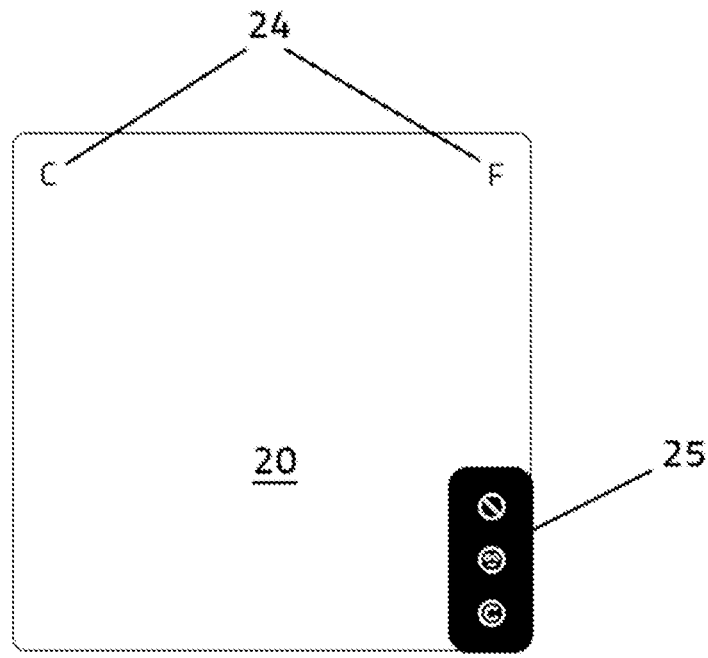
FIG. 18 is an annoying menu for a follower.

See FIG. 16. Users can elect to "follow" publications by other users, and thereby view published cards shared by others. Options for followers, such as the examples listed below, can be enabled or disabled according to the desire of the owner-user.

Follow: A user may elect to "follow" a publication and thereby becomes a follower. The follower may follow revisions and amendments to the card, and the card could appear in a "follow" page for that user, which may be public (such as on a profile) or private. In some embodiments, and depending on the card owner's settings, permission from an owner may be required to follow a card. Followers may also be given rights to share the followed publication by its owner.

Watch: Watching a card may be provided as an alternative to following the card. A "watching" user may watch revisions or amendments to the card without the card appearing on the watching user's page. A watching user might have fewer or different permissions than a following user. In some embodiments and depending on owner settings, following may require owner permission, but watching may be done without owner permission but with fewer or no privileges. A user may choose to "watch" another user, a group, or a publication. Typically the user or content being watched is not affected by the watching or the watcher, although they may be made aware of who is watching. As an example, for a given publication, followers must be approved, and can comment on and share the content. For the same publication, watching might be available without permission, but with watchers not allowed to comment on and/or share contents. Watchers might request elevation to become followers.

Move to: Users may be allowed to move and/or copy a card to their own or another user's catalogue. Moving/copying a published card or catalogue is preferably done with a complete set of cards and their connected objects as a group. For example, when a catalogue is moved, all the content and comments within the original catalog can be made active in the new location as well. If a function card is moved, any card which is linked to its function will preferably be moved in or linked tandem. In some embodiments this is equivalent to the "share" function. However, in preferred embodiments "sharing" does not have the same effect as "move to" because with "move to" the link between the old and new cards is broken and the new card is fully independent. With "share" the link to the original creation/creator is continued, and changes and interactions one can be set to automatically affect the other in the same way.

Hide: A follower can hide a card in some embodiments. They may only be able to hide a card created by another user from themselves so it is not shown in future searches or page view. In some embodiments a user might have a permission to hide cards of another from other users. A hide function could also be used if an outside user is allowed to create cards for a page, group, or other user they are following, the outside user being able to hide the cards they themselves create.

The Function Menu

A new blank card 23 may be converted to a function card, in one preferred embodiment by using an "F" icon (i.e. an "interactive element") in a corner of a blank card. See FIGS. 9-10 and 13. When a card is designated as a function card, the card is no longer eligible to be a catalog card and the catalogue menu is disabled. After or at the same time as "function card" is selected, the specific function can be designated. This may be done through a function menu, such as the menu 25 at FIGS. 9-10 and 13. Once a function is selected, the function menu may be converted to a settings menu corresponding to the features and options available for that particular function. Preferably a publish menu remains in the menu options so that the card or cards can be published when desired.

Preferably if "reuse" or "reference" permissions given to the published object prevent suspension or deletion of the card, a "draft" button (which would fully suspend the slide) is converted to "hide" button, which only removes the publication from the publication stream of the owner-user, without withdrawing it from other uses elsewhere.

The function menu covers the function cards that are currently in use. When a new function card is ready, the corresponding menu options are added to the system, at least when editing that card. If a third party is allowed to prepare a function card, that function card is added to the menu after the defined procedure.

Settings Menu for Owner

Figure 11:
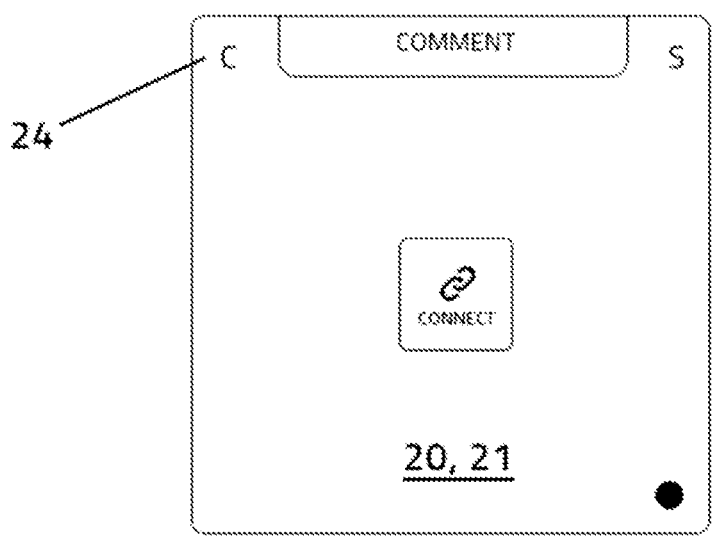
FIG. 11 is a function card with a comment interactive module.
Figure 12:
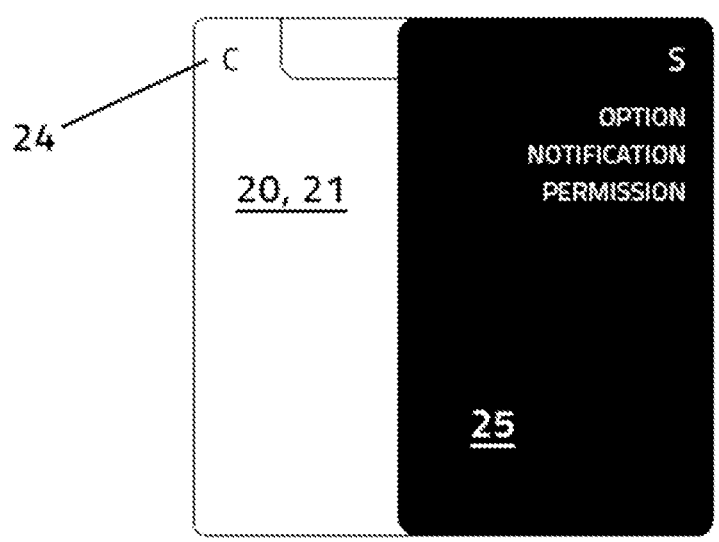
FIG. 12 is a function card with setting menu open.
Figure 13:
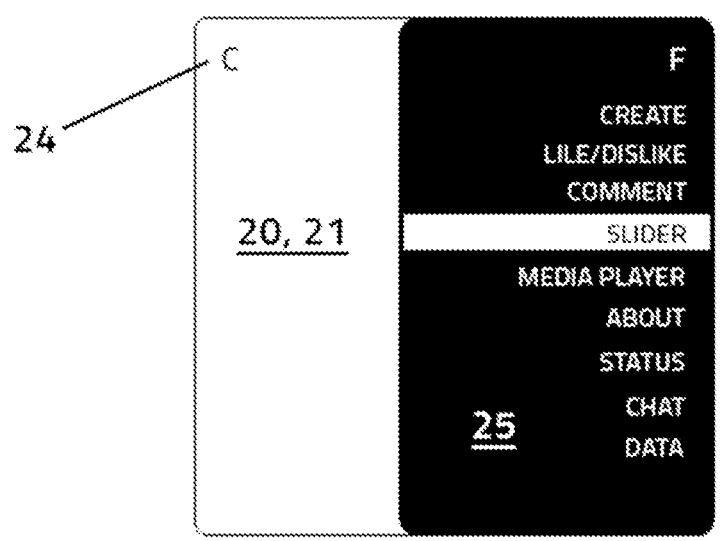
FIG. 13 is a function card with a function menu open and "slider" selected.
Figure 14:
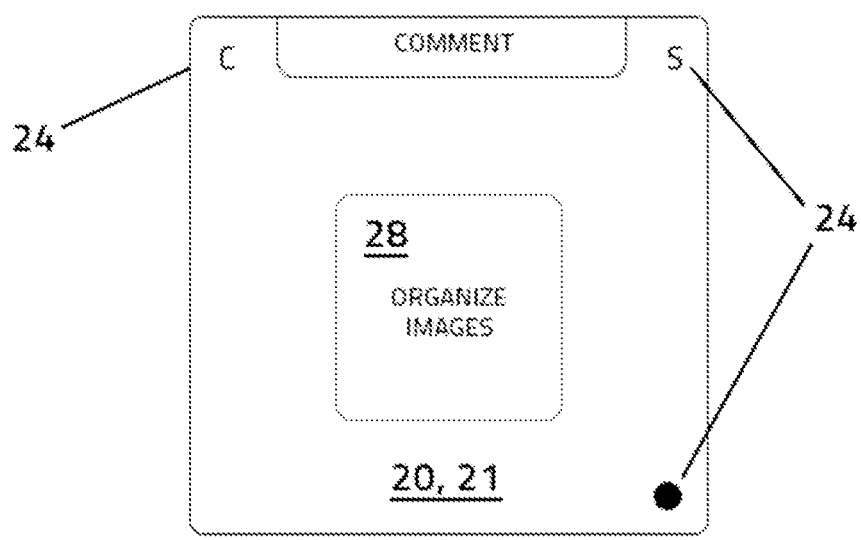
FIG. 14 is a slider card.
Figure 15:
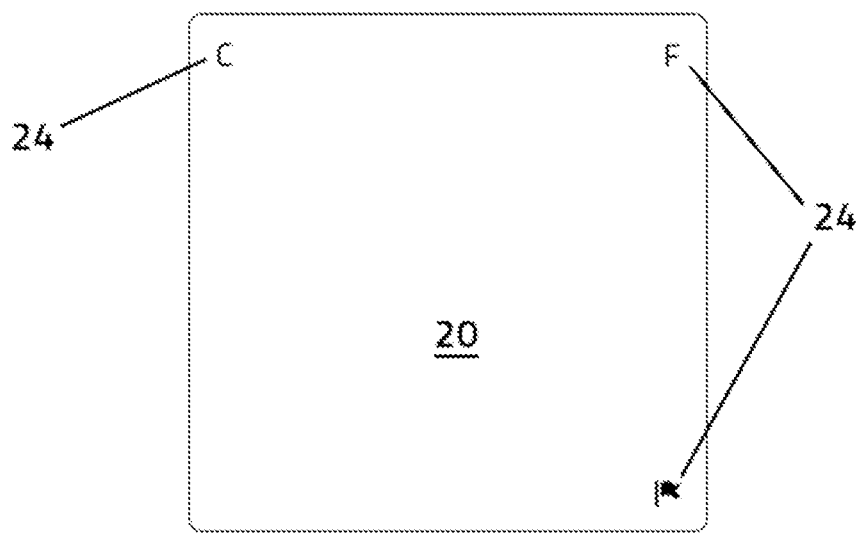
FIG. 15 is a new card for a follower.

When a card is converted to a function card, the Function menu is preferably converted to a Settings menu. FIG. 11-12. The Settings/function menu card typically appears different for the person who prepares it and to a user who only watches it. For the owner of the card the setting menu typically contains option, notification, permission options.

The options presented in the settings menu may vary according to the specific function selected. Different settings will apply, or not, to different types of function cards.

Referring to FIG. 12, "Notification" deals with notifications to the owner to update them regarding their card. Events triggering notifications and the type of notifications are preferably selected by the owner. Events which could trigger updates, or which could be compiled to form an update, could include any or all of: other users watching the card, reuse of the card, reference to the card, likes, comments, requests to follow the card, etc.

"Permission" refers to what other users (such as watchers or followers) are allowed to do with respect to the card. This feature—allowing ordinary users to tailor the permissions for each card—is a significant advantage over other systems. Permissions which may be granted or denied include the ability to comment, evaluate, watch, follow, share, reuse, or reference the card. In preferred embodiments, the owner can provide different settings for different users. For example, users who have been approved to "follow" the card could have more permissions than other users who have not been so approved. In some embodiments, each user has default settings for all of their cards, which they can change for each card or publication when desired.

Settings Menu for Follower

The options provided in the settings/function menu for other users (such has followers) can be different from, and can be controlled by, the owner-user for the card. Functions such as chat, sharing, notification, and other can be enabled or disabled by the owner. There may be one set of permissions for approved followers, and a more restrictive set of permissions for other third party users. Permissions may be tailored for a specific follower.

Chat: The user and follower/watcher may chat as part of the card interface. Preferably the chat history can be saved, either indefinitely or only for that session, as chosen by the owner.

Sharing: The card may be shared by other users, such as followers, with additional users. This sharing may be directly through the SNPS, via e-mail, via other social network, or otherwise. Each sharing option has a distinctive configuration.

Notification: Followers and other users can also receive notifications regarding evens (updates, comments, etc) for cards. In some embodiments there is a default notification setting for followers in general and/or for each follower, which followers can change for each card if desired.

Catalog Menu

A user can convert a new or blank card to a catalog card by selecting the catalog option directly, or simply by placing a second card within that card which, by definition, makes the first card a catalog. In the embodiment shown in FIGS. 3-6, a new card can be created within the current card using a "+" icon in the lower left corner. Adding the new card turns the "current" card into a catalog, and so the function menu is disabled.

Figure 5:
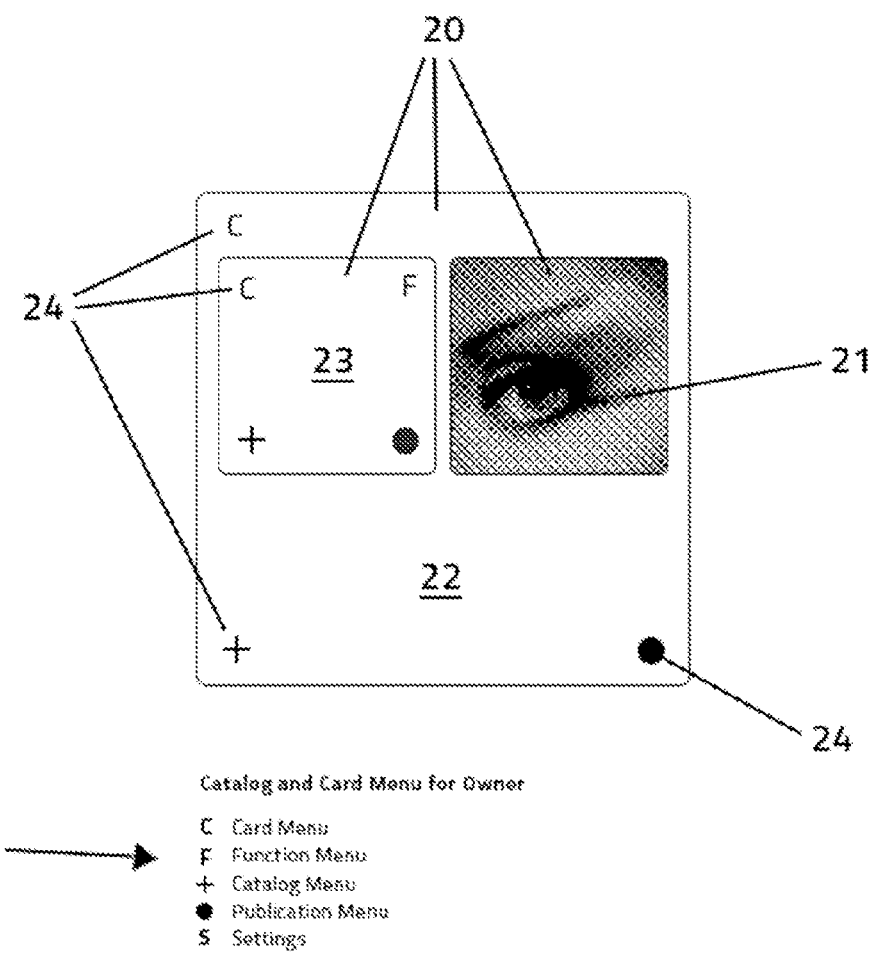
FIG. 5 shows two cards nested within a catalog card (without a menu)
Figure 6:
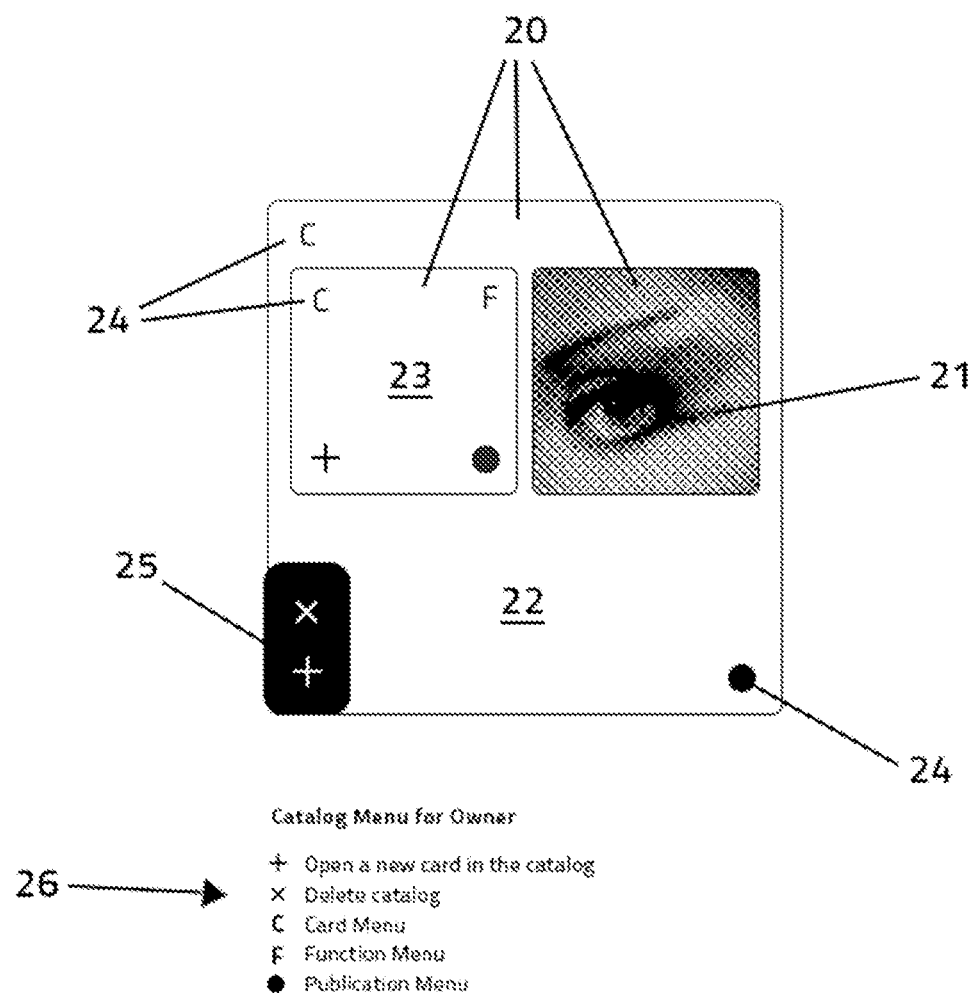
FIG. 6 shows two cards nested within a catalog card with a catalog menu.

FIGS. 5-6 show a large card 22 which is a catalog card. Clicking the "+" icon in FIG. 5 will bring up the catalog menu 25 shown in FIG. 6. Clicking the "X" in the menu in FIG. 6 will delete the catalog card. In preferred embodiments deletion will not occur, or will only occur after a second confirmation step, if there are already other cards within the catalog.

The "+" icon in the menu 25 of FIG. 6 will create a new blank card 23 within the large catalog card, such as the card in the upper left of that figure. The new card 23 can later be made into a function card 21, or a new catalog card 22 nested within the first catalog card.

The "+" icons and the menu 25 are examples of interactive elements for card editing.

Publication Menu for Owner

Figure 7:
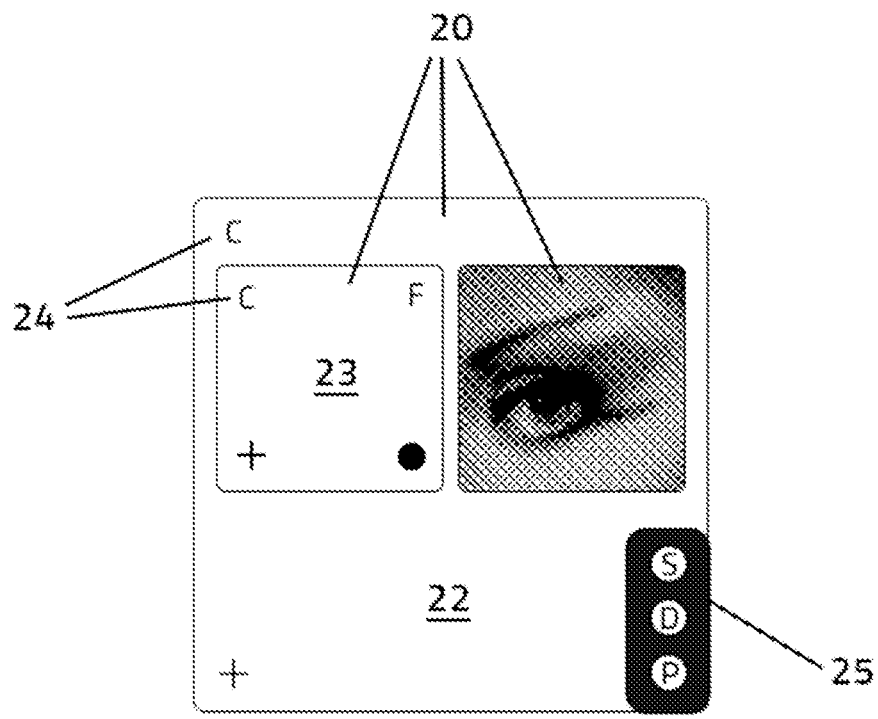
FIG. 7 shows two cards nested within a catalog card with a publishing menu.
Figure 8:
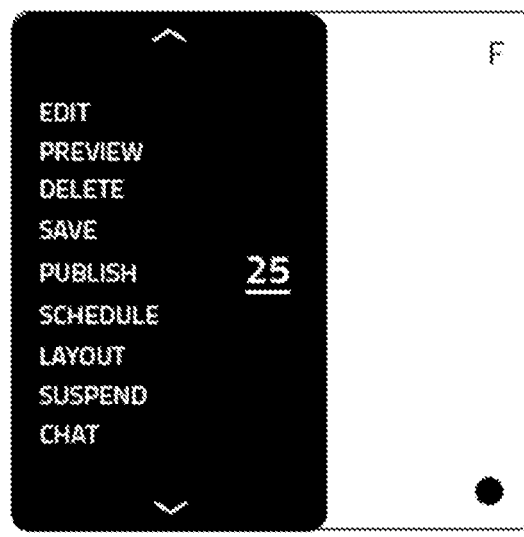
FIG. 8 is a card menu.
Figure 9:
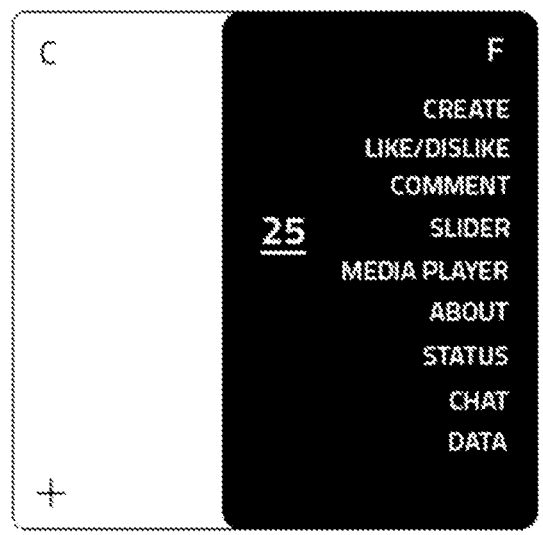
FIG. 9 is a function menu.
Figure 10:
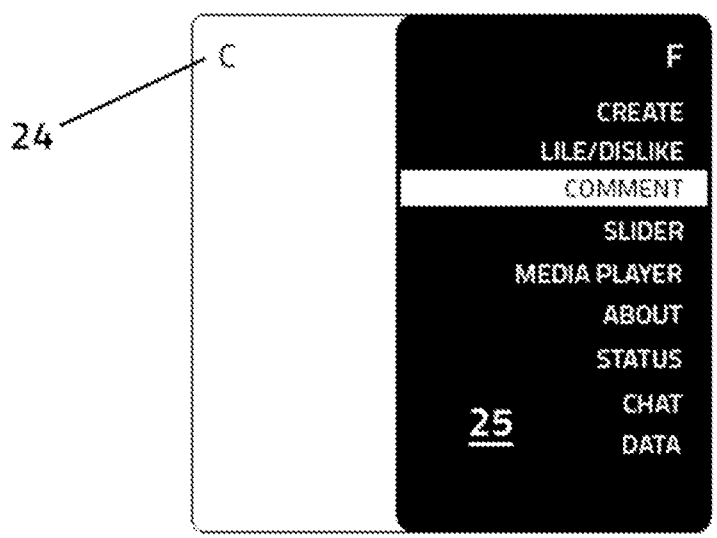
FIG. 10 is a function menu with the comment option selected.

Typically a published card is available for viewing and interaction by at least one person—usually many people— other than the owner(s) of the card. Cards can be switched between "published", "draft", and "suspended" status. FIG. 7. New and unpublished cards could be set to "draft" status by default. Typically "publish" will not be available for a blank card, and "suspend" will not be available for an unpublished card.

Published cards can have their publication "suspended" by the owner, either permanently or for revision and republication. A suspended card is not available to users other than the owner of the suspended card, and perhaps teammates or others with special permission. If certain permissions such as "reuse" or "reference" were given for the published object, suspension of publication and card deletion may be prohibited because such suspension or deletion could harm intervening uses of the publication by others. Where suspension is not available, a "hide" button which removes the publication from the publication stream of the user without withdrawing it from other uses elsewhere may be available as an alternative.

The SNPS can also be used to create a personal archive or diary which may or may not be published, or may be published only in part, as the user selects.

Complaint Menu for Follower

Followers may be provided with a "complaint" menu to flag problem content. See FIG. 18. Followers or other viewers can flag published content at being spam, annoying, illegal, a copyright violation, or otherwise against the SNPS terms of use.

Publication of Sets and Indexing

Publications can be a single card, or they can be a group of cards or a "set". Most commonly, a set of cards will be organized in one or more catalog cards. The catalog card and subsequent publication (or archived file) will contain one or more function cards, and may also contain one or more additional catalog cards.

In some instances, more than one user may contribute to a publication through a SNPS, such as a magazine, radio program, podcast, or newspaper. For example, different members of a group or a team might contribute to the same publication. In other instances, a user may create a publication by combining their own publications and/or the publications of others. The publications of a group of users might be combined by a single other user to form a publication, if permissions allow it.

The cards in a set of cards can be indexed, typically within the catalog cards. Complex publications with multiple nested catalogs can be difficult to organize. As such, careful tagging of cards in the set is recommended.

Preferably default templates are provided to facilitate and simplify indexing for the user. Templates may be provided by the SNPS, created by users for multiple uses, or imported from outside the SNPS. For instance if a user desires to publish a blog, he retrieves a blog template and fulfills the configuration of the blog, using cards, as directed. Typically the user also selects one or more categories for publishing the blog. Card/catalog/user references are linked and these references are saved in the system to serve as a "citation index".

Card and Publication Creation—Flowcharts

FIG. 31 is a flowchart showing user options for creating, editing, and publishing cards. The order in the flowchart is exemplary, and not limiting, including regarding chronology.

A user can open a new card 300 in a new project, an existing project, or their home page 40. Each new card 20,23 will be converted 302 to a function card 21 or a catalog card 22 by the user. New card 300 and convert 302 steps are shown twice each in the flowchart, but each step can be performed only once, or many times. For example, a new card 20 could be created and converted to a catalog card 22. Then another card 20 might be created within that catalog card, which in turn could be converted to either a catalog card or a function card. Once created, card or sets of cards can be published 310. There will typically be editing 312 and arrangement/layout 314 steps after the creation of a card and its publication, as shown at the center and right of the flowchart.

Once card(s) are created they can be edited 312 as discussed in greater detail elsewhere, such as to add content, interactive features, and permissions. The layout within and among cards can also be edited 314. At various points in the card creation and editing process it is possible to preview 316 what the card(s) will look like after publication without actually publishing them.

The size of cards can be changed 320, making different cards larger and smaller. Display options such as stroke, font, and color can be edited 322. Card resolutions can be edited and sorted 324. Sharing permissions 326, follow/watch/reuse/reference permissions 328, and notification settings can be selected for each card or set of cards. The function menu 322 discussed above can be used to edit cards as can, where appropriate, the catalog menu. Once all desired edits are in place, the card(s) are typically published 310.

FIG. 32 is a more formal flowchart for the card creation and conversion process. This flowchart is typical, but not limiting.

At the start 400 of the process the user chooses a catalog 402 to create a new card in. Alternatively, a new project may be initiated. A new card is opened 404 in the selected catalog. Either content or another card can be added 406 to the new card. If a new card is added 408 the original card becomes a catalog card 22. The layout of the card can be edited, and the catalog menu/options are available for modification. Once the user is satisfied with the new catalog card 22 they can either stop 414 the project for the time being, or go back to the beginning of the process and create a new card. It may be possible to publish 420 at this point as well. Alternatively, each new card can be converted 406 to a function card 21. Content or interactive features can be added 410 to the function card. When the card is ready it can be published 420. Alternatively the process can be halted without publishing 414, editing of the function card can continue 420, or the user can continue the process by adding another new card 402,404.

The flow chart of FIG. 32 is further described, using process definitions and with reference to the entity relationship diagram of FIG. 33, as follows:

START→Start of Create the process of identifying card 400.

Choose a Catalog→Selection of the catalog card from CARD TABLE from records that CARD TYPE=Catalog 402 (see FIG. 33).

Open a Card→Create a record in CARD TABLE 404 (see FIG. 33)

Decision "Add into"→"Card", created card define as a catalog and create a record in CATALOG TABLE 406 (FIG. 33).

Setting Catalog & Layout Editing→Ranking cards in the catalog LAYOUT TABLE 408 (FIG. 33).

Decision "Continue"→Yes, Continue the process and go to "Choose Catalog" 412.

Decision "Add into"→"Content" create a card for content encapsulation 410.

Doc., Text, image, mov. etc. contents connect to card in CONTENT TABLE (FIG. 6).

Decision "Ready"→No, Draft status and continue to editing 416.

Decision "Ready"→Yes, ready to publish 416.

Publish→Content publishing 420.

Decision "Continue"→Yes, Continue the process and go to "Choose Catalog" 422.

Decision "Continue"→No, Process stop 414.

FIG. 33 is an entity relationship diagram for a CARD system, for use in implementing a card create and conversion process. Persons of skill in the art can use this general structure to implement the SNPS, also making use of known programming techniques.

In FIG. 33, the Main Tables are:

USER TABLE→User define, Primary Key ID; and

CARD TABLE→Card define, Primary Key ID, OWNERID Foreign Key & connected to USER TABLE The Related Tables are:

CATALOG TABLE→Contained cards in the catalog, CATALOGID Foreign Key & connected to CARD TABLE, CARDID Foreign Key & connected to CARD TABLE;

CONTENT TABLE→connected content to CARD, CARDID Foreign Key & Connected to CARD RABLE; and LAYOUT TABLE→Ranking cards in the catalog, CATALOGID Foreign Key & Connected to CARD TABLE, CARDID Foreign Key & Connected to CARD TABLE.

Interaction and Relations—Users, Groups, and Cards

The main elements of the SNPS are the users and the cards. The principle behind the system is the ability to control the interactions and relations between the various elements with each other. These relationships form the basis of the system, and improved control over these relationships are an advantage of SNPS over existing social networks. The SNPS can be used within a social network system, as a stand-alone system, and via internet or intranet.

The interaction of users with each other and/or with published content can be based on relationships between: User/Group→User/Group (i.e. users and groups with other users and groups), User/Group→Card/Catalogue (i.e. users and groups with cards and groups of cards), and Card/catalogue→Card/catalogue (i.e. cards, including catalogs, with other cards).

Relationships Between Users and Groups

Possible relations and interactions between users and groups with other users and groups include the following.

Friends

"Friends" are users who follow and interact with each other. Users can customize their relationship with their friends on their friend lists. For example, they can tailor the sharing conditions and other permissions for each friend, or for groups of friends. Default permissions can also be set for other users having "friend" status. Relation and interactions between friend-users is therefore according to those defined permissions. Friends typically have greater permissions regarding each other's publications than users who are not friends.

Teammates

Sets of multiple users can be "teammates", typically to work jointly on one or more shared projects and publications. Teammates may be defined as the same individuals as the members of a group, may be a subset of a group, or may be unconnected to a specific user group. The permissions between users in a group can be varied and tailored, but typically will include broad or unlimited privileges at least for the shared project(s). In some embodiments, all the members of a team have the same or similar privileges as an owner to edit, create publish, and share team cards. Teams and their membership may be open, closed but publically visible, or may be kept private from non-members.

In some embodiments, a single user will set up a team. This can involve defining the scope of the teams project(s), which may be a single publication, a specific set of publications, not limited, or otherwise. The initiating user will typically invite other users to become members of the team. Each team may have open membership, or may be limited to users invited and/or approved by the user who started the team, or optionally by any member of the team. The user who creates a team may define the privileges to create, edit, share and publish cards that each team member has, or all team members may have unlimited privileges, equal to an owner, regarding team projects.

Referencing Another User in a Publication

A user may "reference" another user in his publication. The referenced user is then displayed in the network of the user who made the reference. The other user will often be referenced as the source of content or cards which the first user is discussing or using in their publication.

Referencing a user does not necessarily expand the permissions for that user, although it could. For example, a referenced user might be automatically granted rights to comment or and/or share the publication containing the reference. In some embodiments, the reference only extends the visibility of the referenced card to the location of the reference, but will not extend the ability to interact with the referenced content to the new location. Typically the referring card does not affect the referred-to card, and as long as this relation continues, the referred-to card cannot be suspended from publication, only hidden.

Referencing outside cards can be useful in creating bibliographies. This relationship between the cards may be called "bibliography". This is a "marking" relationship. A first card is "referencing" the second card as the source of the information in the first card. The second, referenced card is not affected by the first card, although a link to reach the second card directly may be provided.

Follow, Watch, and Discover: Interactions Between Users and Groups

Following, watching, discovering, and searching are potential interactions between users or groups and other users or groups and their publications. The available interactions between users and groups with the cards of others are governed by both the settings for the cards, and the relationship between the owner of the card and the other user or group. For example, members of a group or followers of a user or group typically have more privileges to view publications/cards than non-followers and non-members. The status of cards as being published, withdrawn, or hidden also affects the interactions allowed. Typically, only published, non-withdrawn, non-hidden cards are viewable.

Follow

A user or group may give permission to another user or group to become a follower. The follow permission may be for a user or a group generally, or only for a particular publication. Followers typically have permissions beyond those granted to non-followers. The specific permissions can very between embodiments and based on the owner's settings. Followers will typically be allowed to view the applicable publication(s), receive notifications relating to the published content, and interact with the content, as defined by the owner. Following may be a one-way relationship where one party follows the other, or a two-way relationship where the group/users both mutually "follow" each other. Followers may be given certain permissions to alter published cards or add cards to a publication. See FIGS. 15-18.

Watch

A user may choose to "watch" another user, a group, or a publication. Typically the user or content being watched is not affected by the watching or the watcher, although they may be made aware of who is watching. Depending on the owner settings, other users may become "watchers" without specific approval, or with a different permission from permission to become a follower. Typically watchers will have more limited privileges than followers, such as being limited to only viewing the content, or having fewer interaction (like/dislike, comment etc.) and sharing privileges than followers. For example, for a given publication, followers must be approved, and can comment on and share the content. For the same publication, watching might be available without permission, but not allow commenting and/or sharing by watchers. Watchers might request elevation to become followers.

The watching user can use the "watch" option to categorize and stay updated on publications, groups, and users of interest. In some cases a user may be watched by other users without being aware of it, or only being made aware after the fact.

In some embodiments the "watch" and "follow" relations could be replaced by a single analogous relationship, although separate "watch" and "follow" options are preferred.

Discover

Users can find or "discover" other users and groups with similar interests, such as by using filters. See FIGS. 21-24. Interaction with the users and groups which are discovered (and their publications) will be allowed or limited based on the permission settings for each. Users and groups found via the "discover" function may be joined, followed, or watched, as appropriate, based on settings for those elements.

In some embodiments the discover function may be limited to searching for other users and groups, as opposed to publications and content, or conversely limited to only publications and content. In some embodiments, the discover function is a "smart" content engine which is automatically guided by the SNPS based on that user's interests, as determined by their biographical settings, groups being followed, the subject matter of their publications, etc. In other embodiments, or alternate functions of one embodiment, the discover function is user-guided based on filters and user selected criteria.

The "index" page (FIGS. 21-24) is used for the "Discover" function for the SNPS. This is where users can search for published cards, groups, and users of interest. The searching is done via one or more filters 61, sorting and selecting relevant cards by card topics, categories, and data. Preferably, card owners can allow, prohibit, or limit the availability of other users to find their cards by searching.

FIGS. 21-24 show an example use of the discover function. The user selects the "Discover" filters 61 from the main menu at FIG. 21. The user ads a "date" filter at FIG. 22. They add a second filter, based on the title, at FIG. 23. Filter criteria can include comment status, number, follow number, following, like number, language, reference, sharing number, title, user/group, or other criteria. In some embodiments the user can enter a preferred value or term for each filter.

A set of results including publications from different users is selected by the SNPS using the criteria. In this example a results page is retrieved with "date+user/group+title" order and the "date+user/group" group. The user may amend the filtering, order and grouping as desired. FIG. 24 shows cards identified in the search, which the user can now interact with and view.

Preferably the user can save a set of search criteria for the index page, and then automatically "watch" the results (i.e. the publications matching that criteria) without running the search again manually. In this example, the user might have an ongoing display, on their home page or elsewhere, of the results of that search updated over time. Preferably the user can also save the results of a single search.

Searching

Users can actively search for content and connections, typically publications, groups, or users, by searching according to user-defined search criteria. The search function provides broad content access to all users. Interactions with publications, users, groups etc. found via a search is controlled by the permissions and settings for the content items which are found. Users and groups found via searching may be joined, followed, or watched, as appropriate, based on privilege settings for those elements.

In some preferred embodiments, the search function is actively guided by search criteria. This is in contrast to the discover function which, in some preferred embodiments, is guided by the SNPS and not the user. In preferred embodiments, the search function is for searching only content and publications, as opposed to other users or groups.

Reusing Cards and Catalogs

It is possible to use the cards of groups and of other users in one's own publication, when permissions allow it. This includes creating content cards which are connected to other user's cards to supply content, and cut-and-pasting catalog cards containing nested cards, among other options. Preferably, the connections within a reused catalog or a reused connected function card are also transferred to the new reuse. Typically the original card owner will be notified of the reuse, and will be able to interact with the new use and new publication. The reuse may extend the relationship of the original owner-user to the publication containing the reuse—i.e., extend the interaction rights and limits of the original to the new location. A reused card can be either a virtual extension, of or fully independent duplicate of, the original card(s). Content can be reused numerous times by different users by linking to catalogs without terminating the link/relationship between the card and its creator. In preferred embodiments aspects of the reused card can be changed by the second user, such as changing appearance and/or functional features.

The reference function discussed above is related to but different from the reuse function. A user may similarly reference a card of another in their own catalog or publication. A reference may be an image of some or all of the original card, or just a simple link or citation. A "reference" typically will not extend the ability to interact with the references content to the new location—it is not a duplicate of or an extension of the original. A reference may be a "look but do not touch" card or element in the new, second publication.

In a reuse, the interaction options of the original are present in the reuse. With referencing, in contrast, the referenced card(s) are visible or linked in the referencing publication, but are not available for interaction without visiting the original.

Relationships Between Cards and Other Cards

There can be several relationships between cards (including both function and catalog cards) and other cards.

Hiding Cards which have been Referenced or Shared by Others

Cards in draft (i.e. never published) or suspended (i.e. published then withdrawn) status are not available for viewing or interaction by other users.

When card(s) have been published, and then shared or referenced by others in their publications, the SNPS may prevent the owner of the original card from withdrawing those cards from publication. This is in order to prevent damaging or interfering with those other publications.

As an alternative, the original owner may be offered the "hide" or archive option for their published and then referenced/shared cards. This typically means the hidden card(s) are made invisible on the owner's pages, but will continue to exist for purposes of the previously initiated interactions by the other users.

The owner may un-hide hidden cards so that they reappear in their publications, although if the cards have been changed they may be considered new publications. The extent to which changes to the previously hidden, edited card are reflected in shared versions of the card can depend on user settings and what type of changes were made.

Coverage: Cards within a Catalog

"Coverage" is a relationship between a catalogue card and another card it contains, which may be either a function card or another catalog card.

At a program level, this relationship can be defined as CardData→MainCardID/CatalogueID. See FIG. 33. If the card ID is the MainCard ID/Catalogue ID of another card, that card is a catalogue and it "covers" at least one other card. This relationship will convert the first card to a catalogue card, and it will lead that card to be related with another card.

When any outside card interacts with a catalogue card, the cards covered by the catalogue card will also be a part of the interaction with the outside card. The covered cards in such a relationship can be attributed the same interaction permissions as the catalog card which is covering them. Or, alternatively, the covered card may have their own separate rules, and require separate permissions from the catalog permissions for interactions with the outside card.

Similarly, permissions given to other users (such as followers) regarding a catalog card will often extend to all covered cards, but they can also be handled differently or separately from the catalog.

Cards which Depend on Other Cards

Cards can "depend on" each other, linking their respective functions and contents. A common example would be an interactive card which depends on a content card. For instance "comment cards", "like/dislike cards", and "evaluation cards" can all be linked to a content card, such as a card containing a picture or video. Content cards may be also connected to each other, with the order of the layout indicating the relationship order. If not directed otherwise, the cards are displayed chronologically, by default.

In a "Depend on" relationship, the main card (on which the other card(s) depend) typically retains its original or default permissions. The depending cards which depend on the main card, however, can be set to have the same interaction permissions as the main card, at least as a default.

Different Versions of a Card

In some embodiments and contexts it is not possible to revise a card once it has been published. Instead, a new version of the card can be prepared and published. As mentioned elsewhere, this is partly to protect the integrity of other publications which have reused or referenced the original publication of the card. The functions and permissions attached to the original card can also be used for the revision, or they can be changed. All the versions of the card make up the history of the card. Version also indicates the dependency of the card.

Preferably, the owner of the new version can set the new card to automatically retain the followers, permissions, and/or relationships of the original card, or not, as the owner prefers.

In other embodiments and contexts, published cards can be revised, and the changes will be reflected in other locations where the cards have been shared or reused by other users.

Encapsulation

Encapsulated information is information either created by itself or relatable from another card which provides information about a catalogue or card. Encapsulated information may include elements such as abstract information, copyright information, and identity of the owner and publisher. The continued presence of the encapsulated information or card depends on the main card. If the main card is suspended, the encapsulated information or card also suspended, and if the main card is deleted from publication, the encapsulated information is also deleted.

User Interface

SNPS can provide users access to both their own publications and publications of others using a variety of interfaces having different appearances. Some preferred interfaces are described and illustrated here, although these should be understood as non-limiting examples.

One option is for a user to access the SNPS via their own publication page "tablet", and another option is via an index card that is used to access to other users' cards and publications.

User Home Page—Tablet

In the example embodiment, the user has a home page 40 which may be called a "Tablet" 40. Preferred interfaces include clickable screen elements for easy actuation by a touch screen or by a cursor. FIG. 19 is a home page for a hypothetical user called "Inanna". The tablet 40 can include profile information 42, and at least some of the user's published cards 20 which may include both catalogs 22 and function/content cards 21. The tablet page 40 can include a list of other users and groups that the user follows 44, functions are on the publication page or his tablet. The user may reach their content objects and relations via their tablet home page, and can review their social relationships from this page.

The SNPS page 40 in FIG. 19 page was created by fictitious user "Inanna" by using cards to create publications. This page could be both the "user" page and/or a page open to at least some of the public, according to the permissions given by Inanna to each content item. In other embodiments, users other than the owner "Inanna" would see a somewhat different screen, or would not see Inanna's home page at all.

The user's areas of interest in this example are house decoration, dancing, internet, and travelling. Inanna created catalogs 22 containing cards for each of those interests. By manipulating the functions and permissions for each of the cards, she publishes as much as she wants, to who she wants, and only for as long as she wants. "Sasha Dith—I love dance" is a sample functional content card 20,21, but the publications may contain nearly any type of content, such as images, sound recordings, video recordings, artwork, writing, etc.

The owner-user decides how to publish the catalogues, and she manages/manipulates the followers and/or watchers who can view and interact with each content item. If she allows others to share her cards, she "marks" the cards or catalogs as such. Followers, watchers, and users finding the publications via the "Discover" feature may see/interact with/share the publications to the extent allowed by Inanna's permissions.

In some embodiments, the user can open a new card, revise an existing card under a new category (catalogue) and also keep the previous card and category, revise the previous one, add a new function etc.

Some or all of the tablet page 40 could be treated as a catalog. The objects that are displayed on the opening page are then objects within that catalogue. The user can then drill down into a catalog card 22 to see the cards within each topic. In this example, the "Internet" index 22 in the home page 40 of FIG. 19 contains a sub-catalog 22 "Social Media" (page not shown). The "Social Media" catalog, in turn, contains the cards shown at FIGS. 25-26. FIGS. 25-26 are the top and bottom half of a single scrollable internet page.

In the depicted embodiment, tabs at the top of the page in FIGS. 25-26 are tabs 50 which correspond to the catalog structure. Preferably both the current catalog level, and catalog levels above the catalog being displayed are shown in tabs 50 or otherwise. The tabs 50 can be used to easily navigate between catalogs 22 or folders.

FIG. 19 shows four tabs 50 at the top—House Decoration, Dancing, Internet, and Traveling—which correspond to the four catalog cards on the tablet page below 40. Each of the four catalogs 22 will contain cards with content in the applicable category. The catalogs can each contain additional catalogs 22, breaking up those topics further into sub-categories.

FIGS. 25-26 show the contents of a "social media" catalog. Social media here is an arbitrary category—the category could equally well have been sports, pets, or any other subject. The two figures are the top and bottom portions of a single computer page. The social media catalog 22 is within the "internet" catalog shown in FIG. 19, as shown by the hierarchal tabs 50 at the top of FIG. 25. The social media catalog 22 includes a number of function cards 21. Content function cards include the Social Media Trends 2014 video at the bottom of FIG. 25, and the Data card near the center of FIG. 25. The comment posting card at the lower and middle left of FIG. 26 is an interactive function card.

The Main Menu

Preferred embodiments include a main menu 60 for switching between the major functions of the SNPS. In this example, the main menu 60 is opened using an icon 24 at the upper left of FIGS. 19-25. The options on this main menu include "follow", "watch", "discover", "search", "settings", and sign out, although the options may vary between embodiments. See FIG. 20. The user can also return to their home page and personal card index via the main menu.

The user may switch to the Card Index/index cards/Discover pages via Main Menu and may organize all the settings related to the website.

System Physical Overview

FIG. 28 is the general flow chart of the social network system according to the prior art, and which is also useful with the present invention. The main system typically comprises a file server 72, storage array 74, application server 76, and a database system 78. The system 70 is linked to one or more hosting sites 80, which in turn provide connection to the network 84 which can include the internet. Digital applications 86 on client devices 88 are connected to the network 84 and can access various systems. The same or similar elements can also be used with the instant invention. Browsers and other electronic applications 86 can be used to access both the prior art and the new system.

FIG. 29 is the schematic view of a social network system according to the present invention. The SNPS System 90 can be substituted for the prior art system 70 as it is shown in FIG. 28, and is here disclosed including that arrangement and context.

The SNPS system 90 can also include a file server 92, storage array 94, application server 96, and a database system 98. Users 100, individually or as a group 102 as discussed above, interact with the SNPS system 90. This may be via the internet, using a locally saved and executed program, or otherwise. The SNPS system 90 preferably uses content storage 110 to store cards 20 and other content related to the system in close association with the SNPS system. The content storage 110 may be the database system 98 and/or the storage array 94.

SNPS publications can be saved to the SNPS system as downloadable files. Users can keep these locally for various uses. Preferably the downloadable files are in a format which is compatible with commonly available software and websites. Images, documents, videos, and other content for use with the SNPS system can be uploaded to the SNPS system 90. Preferably cards, user and group information, card and catalogue management systems, and other parts of the SNPS publication building process are stored in the SNPS database system 98. FIG. 29. Preferably cards are created and assembled at the SNPS system, are published, and then copies of the resulting publication can be exported from the SNPS system 90. Copies of the publication are preferably retained as well. Publications can be saved as web pages which can be easily shared, such as by forwarding a link to the web page or by using the link to share the publication on an outside social media platform.

The terms "first card", "second card", "third card", etc. in the claims do not, without more, require that the cards be created in that order. The terms are used for convenience simply to refer to different cards. Similarly, the "first user", "second user" etc. could be any non-identical users, and do not have to act in a specific sequence unless otherwise indicated in the claims. In practice, there will normally be many more users and cards than specifically recited in the claims.

The invention includes computer programs implementing the SNPS, servers and systems for running an SNPS both in isolation, and as part of a network including user devices, and user devices locally running all or part of an SNPS. The invention includes both methods and systems for SNPS embodiments. The invention includes a generalized card based system for creating, organizing, and publishing content with customized permissions. It also includes a system where users can search, view, and interact with other user's publications.

The various steps, elements, features and embodiments described herein are contemplated and disclosed in all reasonable combinations and subsets. The SNPS systems can include some or all of the attributes described herein, as well as additional features not specifically enumerated here.

While a specific embodiment of the invention has been shown and described in detail to illustrate the application of the principles of the invention, it will be understood that the invention may be embodied otherwise without departing from such principles.

What is claimed is:

1. A method of providing a Social Network Publication System (SNPS) for users to custom assemble multi-tiered publications comprising:

providing at least one computer system having non-transitory SNPS instructions stored thereon, and executing the SNPS instructions;

wherein the computer system comprises at least one server, and is in communication with a plurality of electronic user devices through a communication network; and wherein the user devices present a graphical interface which allows users to interact with the SNPS;

using the SNPS, allowing a first user using a user device to:

establish a user account in the SNPS;

create a first card;

designate the first card to be a catalog card, wherein the catalog card is capable of holding and organizing one or more other cards;

create a second card within the first card;

designate the second card to be a function card, wherein the function card comprises at least one of media content and an interactive module;

adding at least one of media content and an interactive module to the second card; optionally creating one or more additional cards;

selecting permission settings for at least said second card, the permission settings comprising: instructions that one or more other users of the SNPS are or are not allowed to interact with the second card, and instructions that one or more other users of the SNPS are or are not allowed to share the second card with third parties;

after said cards have been created and said permissions set, publishing the cards by the user in a catalogue designated by the user, wherein the cards become visible to one or more other users once they are published;

using the SNPS, allowing a second user using a user device to:

perform a search within the SNPS, the search identifying a set of published cards meeting one or more search criteria, the set of published cards comprising one or more cards previously published by the first user;

view at least one of the cards published by the first user;

the SNPS using permission settings set by the first user to determine if the second user is allowed to interact with at least one of the cards published by the first user, and offering the second user an option to interact with a card published by the first user if allowed by the permission settings; and the SNPS using permission settings set by the first user to determine if the second user is allowed to share at least one of the cards published by the first user with third parties, and offering the second user an option to share a card published by the first user if allowed by the permission settings.

2. A method of providing a Social Network Publication System (SNPS) for individuals to custom assemble multi-tiered publications comprising:

providing at least one computer system having non-transitory SNPS instructions stored thereon, and executing the SNPS instructions;

wherein the computer system comprises at least one server, and is in communication with a plurality of electronic user devices through a communication network; and wherein the user devices present a graphical interface which allows users to interact with the SNPS;

using the SNPS, allowing a first user using a user device to:

establish a user account in the SNPS;

create a first card;

designate the first card to be a catalog card, wherein the catalog card is capable of holding and organizing one or more other cards;

create a second card within the first card;

designate the second card to be a function card, wherein the function card comprises at least one of media content and an interactive module;

adding at least one of media content and an interactive module to the second card;

optionally creating one or more additional cards;

selecting permission settings for at least one of said cards, the permission settings comprising: instructions that one or more other users of the SNPS are or are not allowed to interact with the at least one card, and instructions that one or more other users of the SNPS are or are not allowed to share the at least one card with third parties;

after said cards have been created and said permissions set, publishing the cards by the user in a catalogue designated by the user, wherein the cards become visible to one or more other users once they are published;

using the SNPS, allowing a second user using a user device to view at least one of the cards published by the first user.

3. The method of claim 2, wherein the first user adds at least one interactive module to at least one of said cards, and wherein the interactive module allows other users to at least one of post comments, provide a rating, and click an icon to express approval.

4. The method of claim 2, wherein the first user selects permission settings for at least one card which at least one of allow and prohibit one or more other users from sharing that card;

wherein the SNPS uses the permission settings set by the first user to determine that the second user either is or is not allowed to share the card;

preventing the second user from sharing the card if the permission settings indicate that the second user is not allowed to do so; and offering the second user an option to share said at least one card if the permission settings indicate that the second user is allowed to share the at least one card.

5. The method of claim 2, wherein the first user selects permission settings for at least one card having an interactive module which at least one of allow and prohibit one or more other users from interacting with that card;

wherein the SNPS uses the permission settings set by the first user to determine that the second user either is or is not allowed to interact with the card;

preventing the second user from interacting with the card if the permission settings indicate that the second user is not allowed to do so; and offering the second user an option to interact with said at least one card if the permission settings indicate that the second user is allowed to interact with the at least one card.

6. The method of claim 2, wherein the first user selects permission settings for at least one card which prohibit certain other users from viewing that card;

wherein a third user using a user device performs a search within the SNPS, and wherein at least one card published by the first user which was viewed by said second user is excluded from the third user's search results based on a permission setting prohibiting the third user from viewing the card.

7. The method of claim 2, wherein the cards are created within a user profile for the first user.

8. The method of claim 2, wherein the first user creates a third card within the first card, and designates the third card to be a catalog card which is nested within the first card; and wherein the first user creates a fourth card within the third card, the fourth card being nested within both the third card and the first card.

9. The method of claim 2, wherein after publishing the cards, the first user withdraws at least one card from publication, and the withdrawn card is no longer visible to other SNPS users.

10. The method of claim 2, wherein when the first user first creates the first card it is a blank card, the blank card comprising one or more interactive elements which the first user can use to turn the blank card into either (1) a function card containing at least one of an interactive element and a content element or (2) a catalog card for holding other additional cards, and to which one or more additional cards are subsequently added.

11. The method of claim 2,
wherein when the first user creates the first card it is a blank card, and wherein the first card is represented as a shape on a viewing screen of the first user's user device;
wherein the blank card comprises a plurality of interactive elements which the first user can use to turn the blank card into either a function card or a catalog card; and
wherein the interactive elements comprise at least one of an icon and a drop-down menu.

12. The method of claim 2, wherein the first card and the second card are displayed as shapes in a viewing screen of the first user's user device; and
wherein the second card is represented as a smaller shape which is physically within a larger shape which represents the first card.

13. The method of claim 2, wherein the first card and the second card each comprise a plurality of interactive elements for editing each respective card; and
wherein the first card has a set of interactive elements which are specific to catalog cards;
wherein the second card has a set of interactive elements which are specific to function cards; and
wherein the sets of interactive cards specific to catalog cards and specific to function cards are different.

14. The method of claim 2,
wherein each card can be assigned its own permission settings;
wherein the step of selecting permission settings includes the first user selecting different permissions settings for each or two or more different cards and publishing said two or more different cards.

15. The method of claim 2, wherein a third user reuses one or more cards previously created by the first user by linking to the one or more cards.

16. The method of claim 2, wherein first user is a member of a team, the team comprising the first user and a third user;
wherein said first and second cards are part of a project belonging to said team;
wherein the third user adds at least a third card to said project; and
wherein the first, second, and third cards are published in a single publication.

17. The method of claim 2, wherein the first user turns the second card into a slide card which allows viewers to sequentially view a plurality of content items within the second card by sliding between the items.

18. The method of claim 2:
wherein the second user makes a request using the SNPS to become a follower with regard to one or more cards published by the first user;
wherein the first user approves the second user's request to become a follower;
wherein the second user then becomes a follower with regard to at least said one or more cards published by the first user, and wherein the second user has one or more additional privileges with regard to said one or more cards as a result having follower status.

19. The method of claim 2,
wherein said second card is visible in a first location managed by said first user;
wherein the first user selects permission settings for the second card;
wherein said second user is offered an option to share said second card;
wherein the second user shares the second card, and the second card then becomes visible in a second location managed by said second user;
wherein the permission settings previously selected by the first user for the second card apply to the second card in the second location.

* * * * *